United States Patent
Suzuki et al.

(10) Patent No.: US 10,009,501 B2
(45) Date of Patent: Jun. 26, 2018

(54) OPTICAL PRINT HEAD, IMAGE FORMING APPARATUS, AND METHOD OF MANUFACTURING THE OPTICAL PRINT HEAD

(71) Applicant: Oki Data Corporation, Tokyo (JP)

(72) Inventors: Takahito Suzuki, Tokyo (JP); Manabu Imai, Tokyo (JP); Masamitsu Nagamine, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days. days.

(21) Appl. No.: 15/474,116

(22) Filed: Mar. 30, 2017

(65) Prior Publication Data

US 2017/0289384 A1    Oct. 5, 2017

(30) Foreign Application Priority Data

Mar. 31, 2016    (JP) ................. 2016-070661

(51) Int. Cl.
*H04N 1/04*    (2006.01)
*H04N 1/028*    (2006.01)

(52) U.S. Cl.
CPC . *H04N 1/02845* (2013.01); *H04N 2201/0094* (2013.01)

(58) Field of Classification Search
CPC .... G02F 2001/13625; G02F 1/133365; G06K 15/1247; G06K 15/12; G06K 15/1238; G06K 15/1252; G06K 15/1257; G06K 15/1295; H04N 1/02815; H04N 1/02845; H04N 1/02855; H04N 1/02865; H04N 1/02895

USPC ...... 355/53, 43, 46, 67, 405, 41, 52, 55, 71; 348/125, 126, 129, 127, 128, 87, 92; 358/302, 296; 362/311.01, 311.02, 330, 362/396, 457

See application file for complete search history.

(56) References Cited

U.S. PATENT DOCUMENTS

| | | | | |
|---|---|---|---|---|
| 4,829,321 | A * | 5/1989 | Iizuka ................. | B41J 2/45 250/227.31 |
| 6,366,338 | B1 * | 4/2002 | Masubuchi ........... | B41J 2/45 355/41 |
| 6,704,862 | B1 * | 3/2004 | Chaudhry ............ | G06F 9/3842 712/24 |
| 8,581,946 | B2 * | 11/2013 | Nagumo .............. | B41J 2/45 347/132 |
| 9,041,760 | B2 * | 5/2015 | Tajima ............... | G03G 15/0435 347/238 |

(Continued)

FOREIGN PATENT DOCUMENTS

JP    200818700 A    1/2008

*Primary Examiner* — Negussie Worku
(74) *Attorney, Agent, or Firm* — Panitch Schwarze Belisario & Nadel LLP

(57) ABSTRACT

An optical print head for illuminating an image carrier facing the optical print head includes: a substrate on which a light emitting element array is mounted; a lens array for focusing light emitted from the light emitting element array onto the image carrier; a holder holding the substrate and the lens array; and at least one spacer member, disposed on the holder, for maintaining a predetermined distance between the lens array and the image carrier, the at least one spacer member being made of curable resin that is cured under a predetermined condition or fixed to the holder with curable adhesive that is cured under a predetermined condition.

17 Claims, 22 Drawing Sheets

(56) References Cited

U.S. PATENT DOCUMENTS

| | | | |
|---|---|---|---|
| 9,696,649 B2* | 7/2017 | Kaneto | G03G 15/04036 |
| 9,778,591 B2* | 10/2017 | Shiraishi | G03G 15/0409 |
| 2003/0128399 A1* | 7/2003 | Chino | B41J 2/445 |
| | | | 358/296 |
| 2005/0024475 A1* | 2/2005 | Futakami | B41J 2/445 |
| | | | 347/238 |
| 2010/0051975 A1* | 3/2010 | Suzuki | H01L 25/0756 |
| | | | 257/89 |
| 2011/0242261 A1* | 10/2011 | Komiya | B41J 2/451 |
| | | | 347/224 |
| 2013/0088558 A1* | 4/2013 | Nakajima | B41J 2/451 |
| | | | 347/224 |
| 2013/0194550 A1* | 8/2013 | Tanigawa | F21V 21/00 |
| | | | 353/30 |
| 2016/0313664 A1* | 10/2016 | Kaneto | G03G 15/04036 |

* cited by examiner

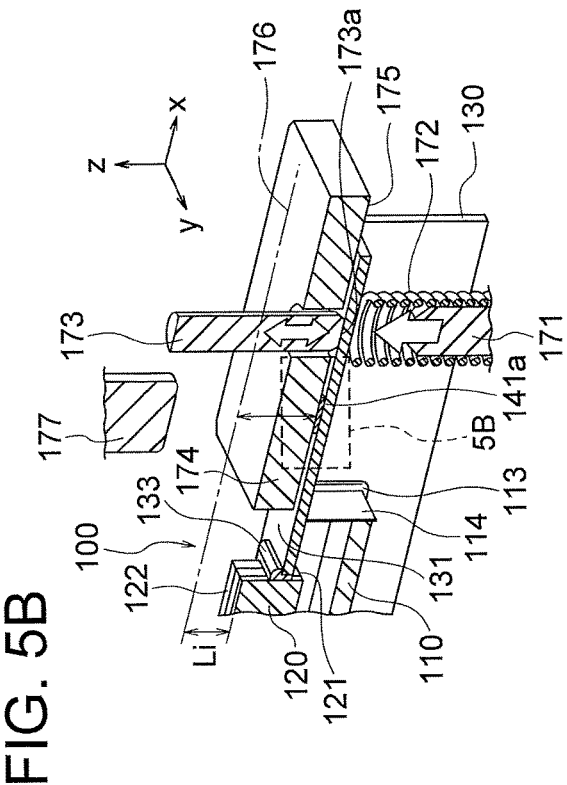
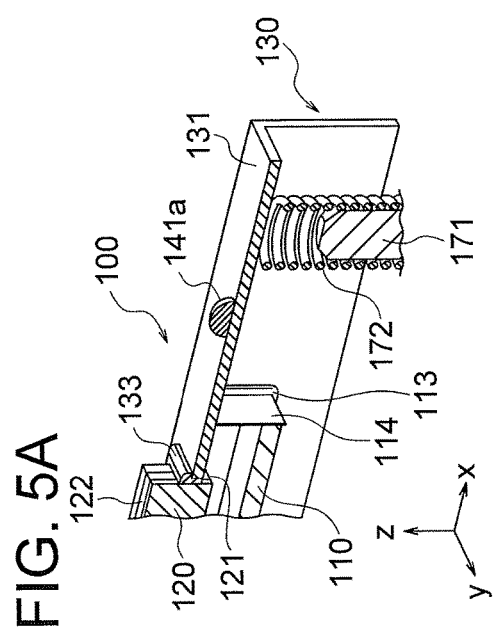

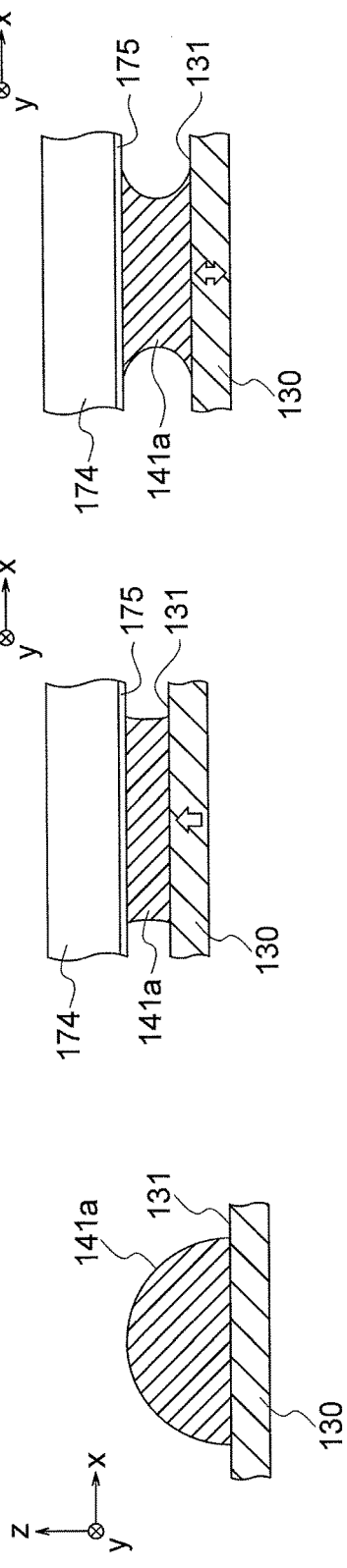
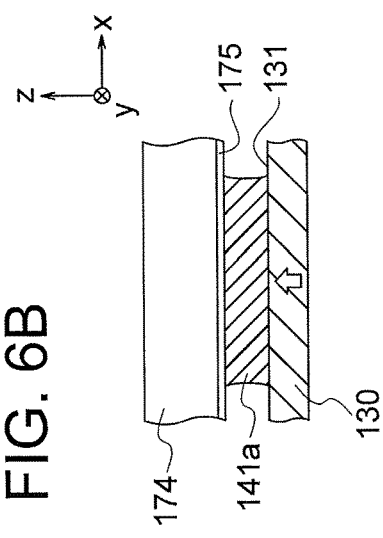
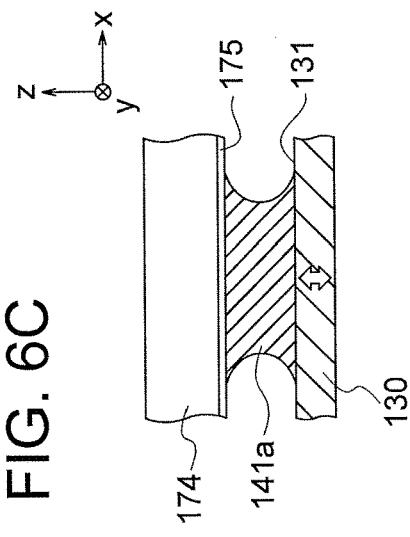
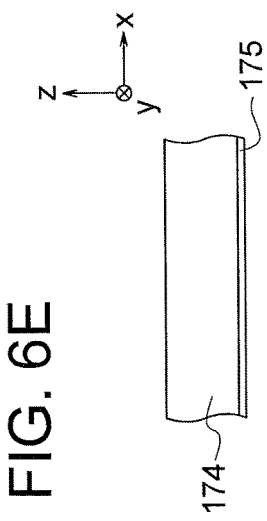
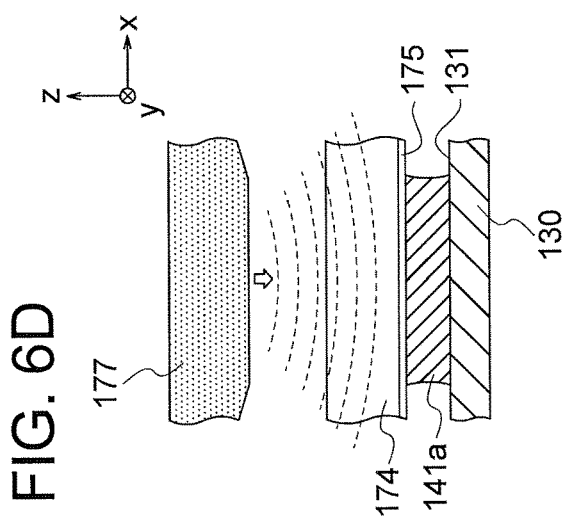

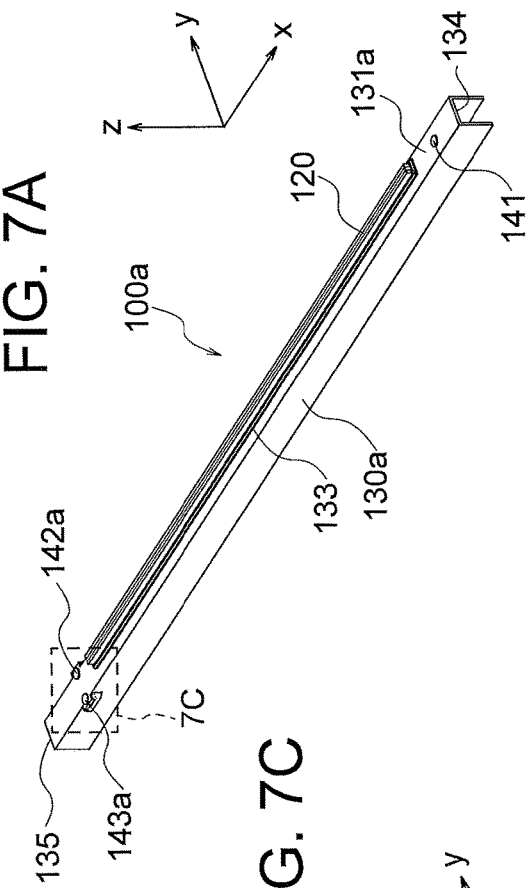
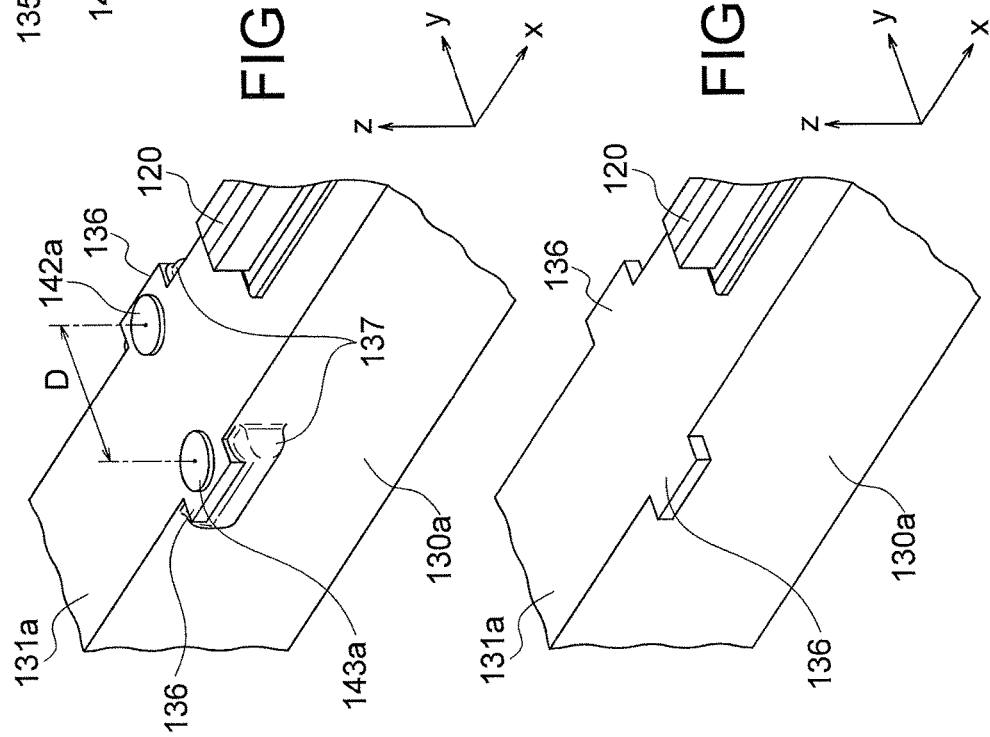

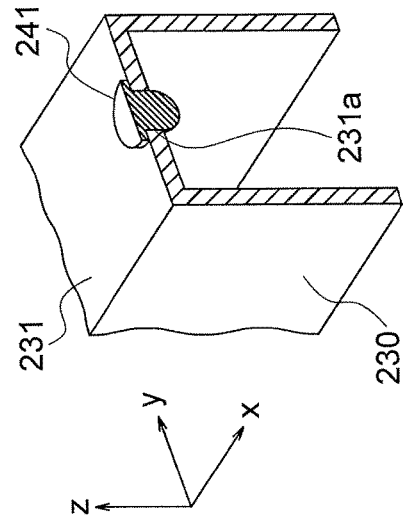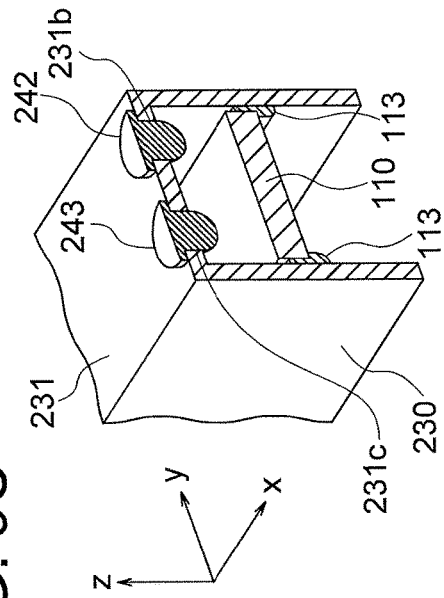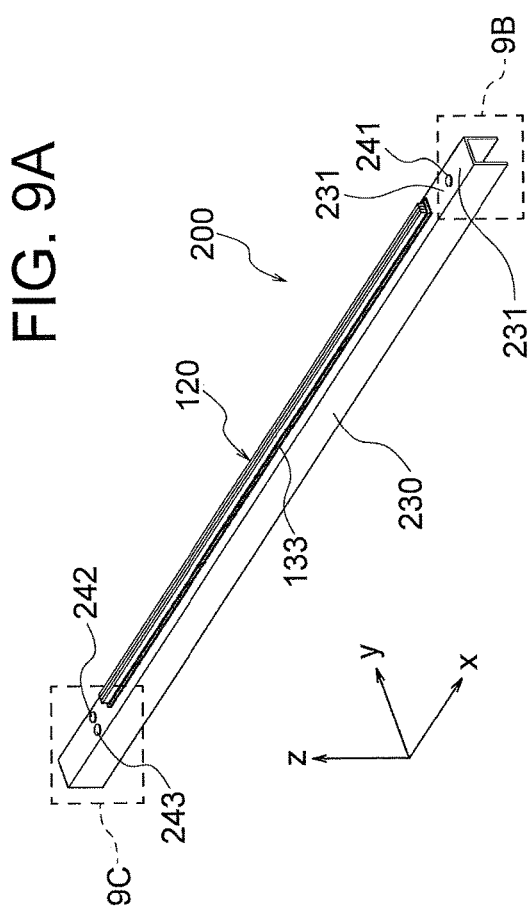

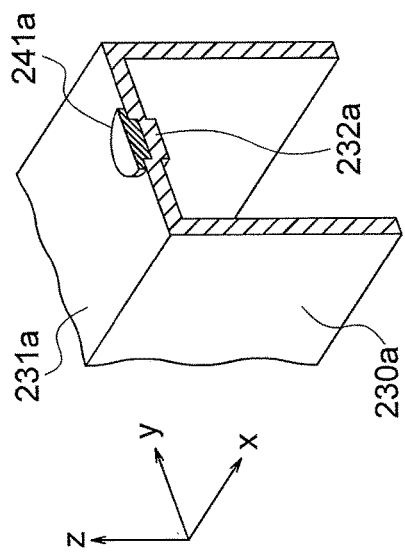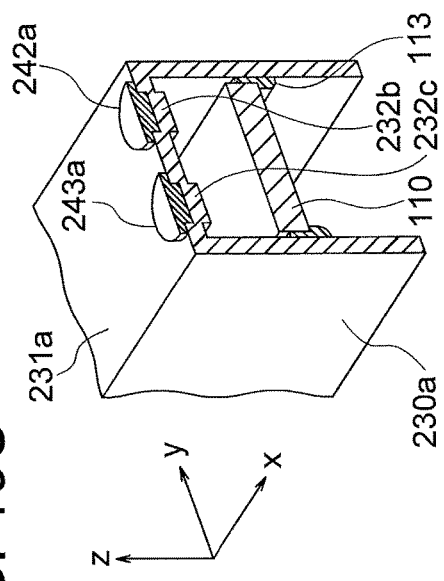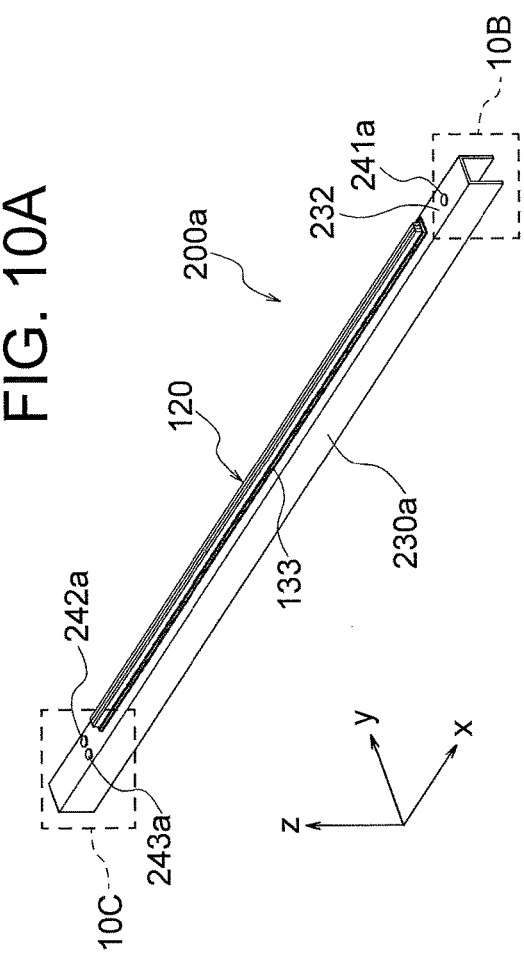

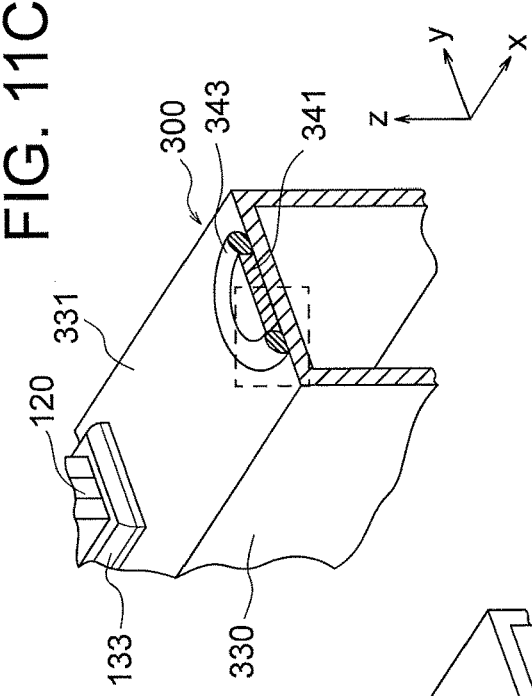
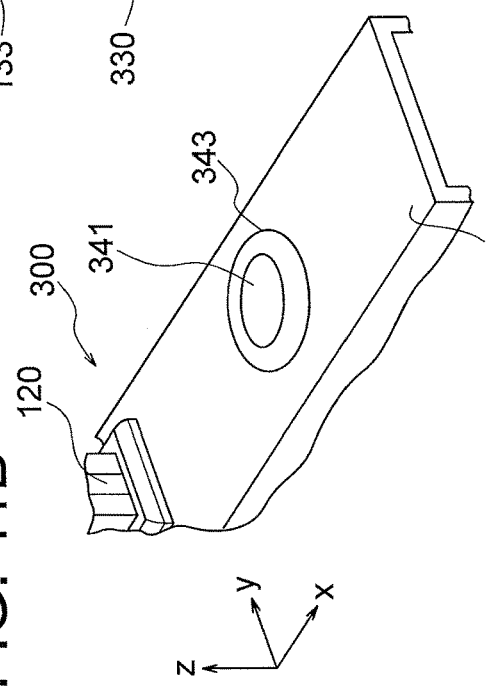
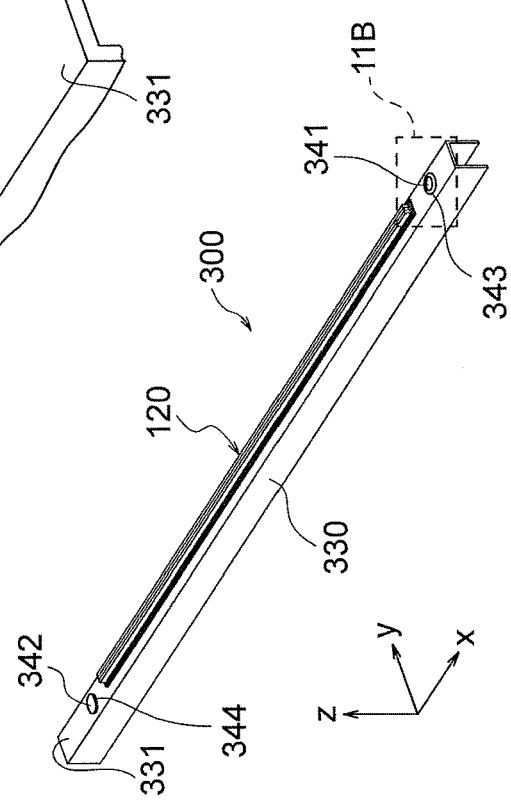
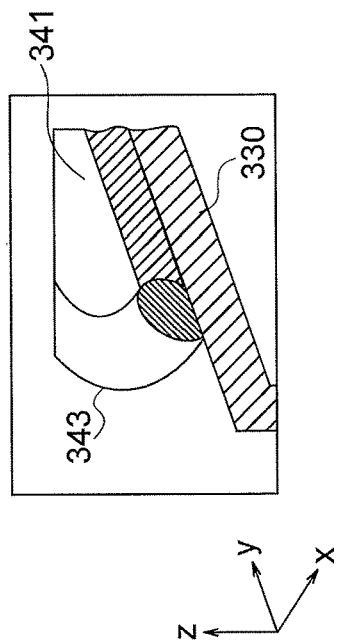

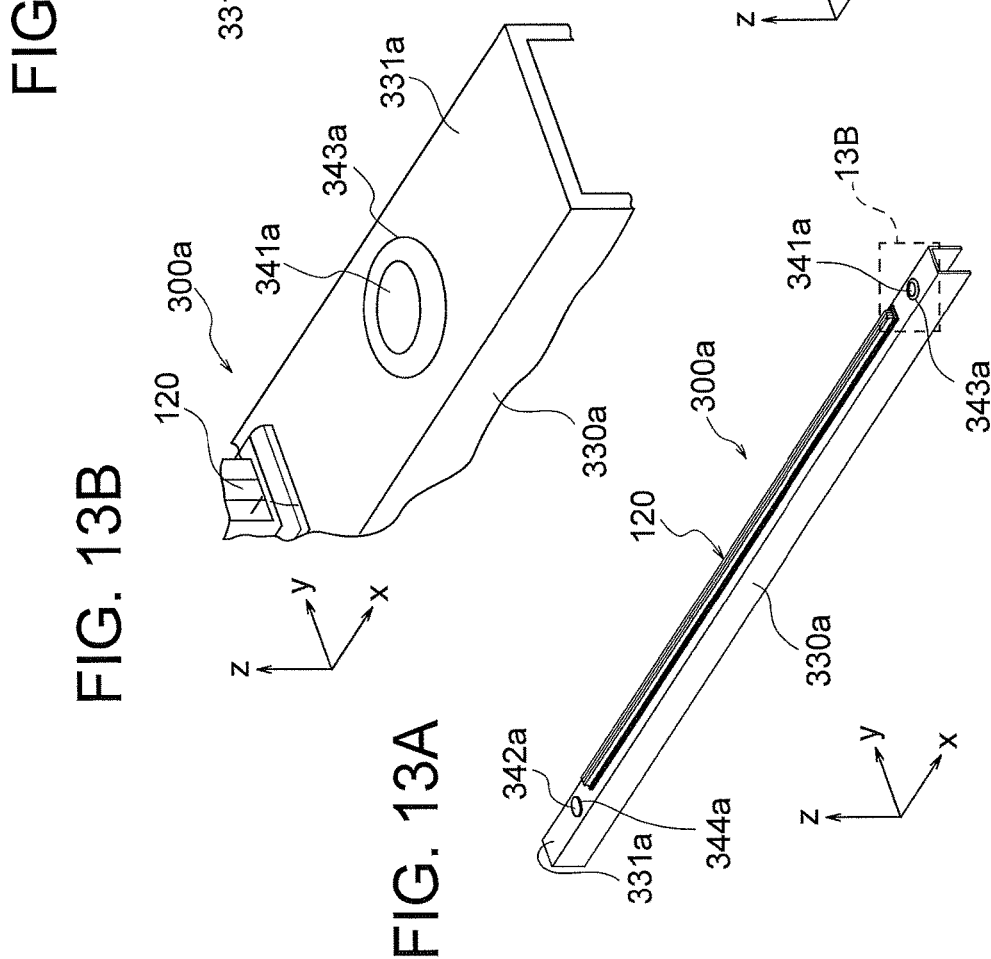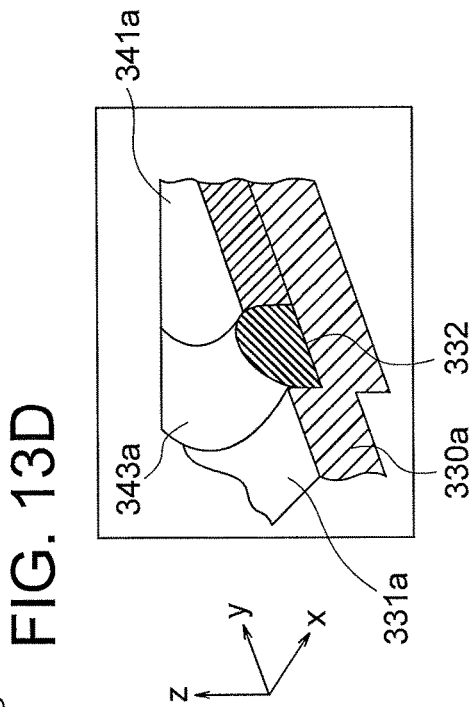

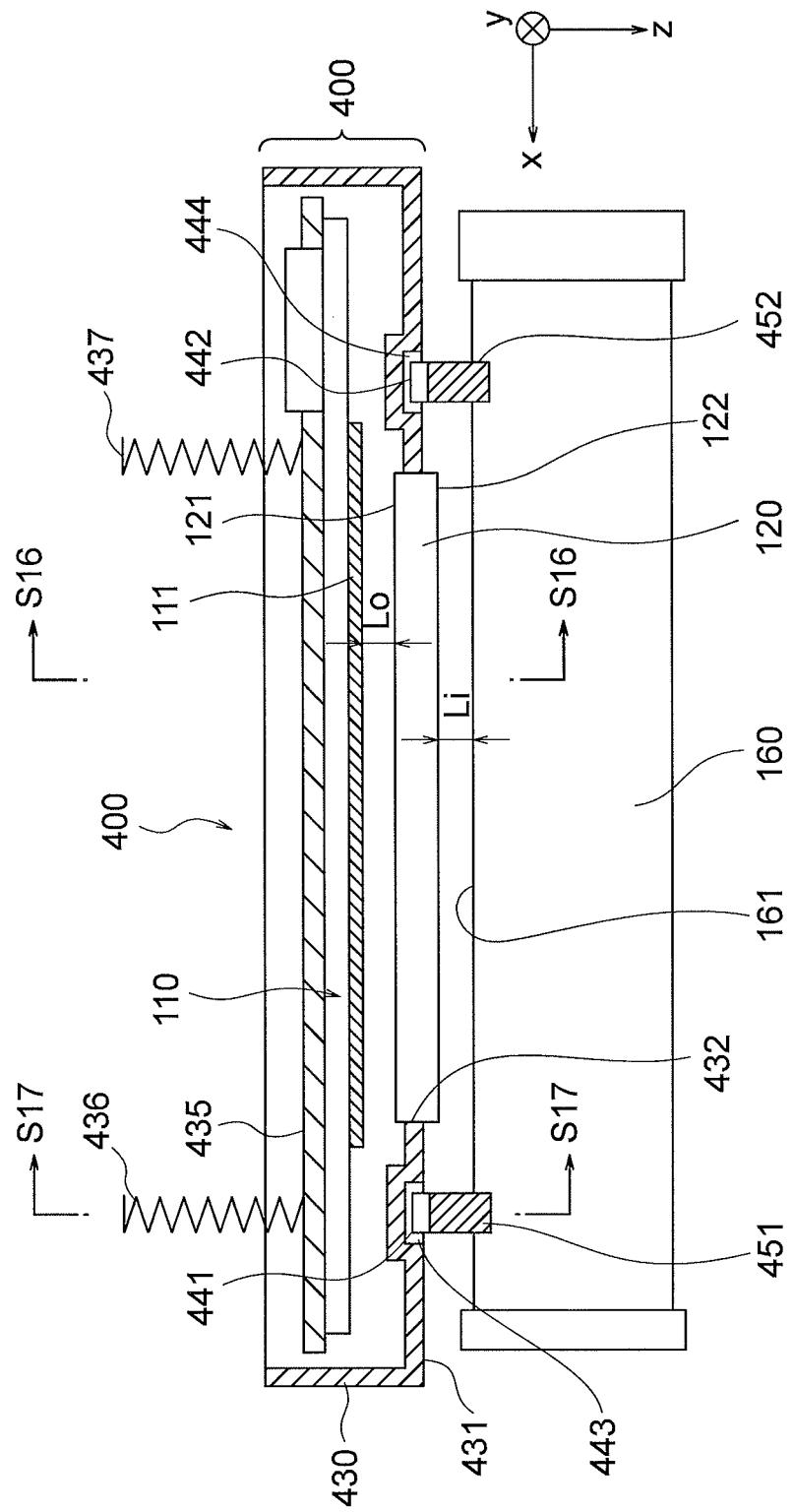

OPTICAL PRINT HEAD, IMAGE FORMING APPARATUS, AND METHOD OF MANUFACTURING THE OPTICAL PRINT HEAD

BACKGROUND OF THE INVENTION

1. Field of the Invention

The present invention relates to an optical print head, an image forming apparatus including the optical print head, and a method of manufacturing the optical print head.

2. Description of the Related Art

Japanese Patent Application Publication No. 2008-18700 discloses a light emitting element diode (LED) head as an exposure device of an electrophotographic image forming apparatus. The LED head includes a substrate on which an LED array chip is mounted, a rod lens array, and a holder holding the substrate and rod lens array. The holder faces a photosensitive drum via spacers. A clearance (or distance) between a surface of the rod lens array and a surface of the photosensitive drum is adjusted so that the rod lens array focuses light emitted from the LED array chip onto the surface of the photosensitive drum. The LED head includes eccentric cams for adjusting the clearance between the surface of the rod lens array and the surface of the photosensitive drum.

However, the LED head has a complicated structure requiring many parts, and thus is costly.

SUMMARY OF THE INVENTION

An aspect of the present invention is intended to provide an economical optical print head capable of maintaining a predetermined distance between a lens array and an image carrier, an image forming apparatus including the optical print head, and a method of manufacturing the optical print head.

According to an aspect of the present invention, there is provided an optical print head for illuminating an image carrier that faces the optical print head. The optical print head includes: a substrate on which a light emitting element array is mounted; a lens array for focusing light emitted from the light emitting element array onto the image carrier; a holder holding the substrate and the lens array; and at least one spacer member, disposed on the holder, for maintaining a predetermined distance between the lens array and the image carrier, the at least one spacer member being made of curable resin that is cured under a predetermined condition or fixed to the holder with curable adhesive that is cured under a predetermined condition.

According to another aspect of the present invention, there is provided an image forming apparatus including: an image carrier; and the above optical print head that illuminates the image carrier with light based on image data.

According to another aspect of the present invention, there is provided a method of manufacturing an optical print head for illuminating an image carrier that faces the optical print head. The method includes: placing a curable resin on a holder holding a substrate on which a light emitting element array is mounted and a lens array for focusing light emitted from the light emitting element array onto the image carrier; adjusting a height of the curable resin in a direction from the lens array to the image carrier; and curing the curable resin to form a cured product as a spacer member for maintaining a predetermined distance between the lens array and the image carrier.

According to another aspect of the present invention, there is provided a method of manufacturing an optical print head for illuminating an image carrier that faces the optical print head. The method includes: placing, on a holder holding a substrate on which a light emitting element array is mounted and a lens array for focusing light emitted from the light emitting element array onto the image carrier, a spacer member for maintaining a predetermined distance between the lens array and the image carrier, and a curable adhesive; adjusting a height of the spacer member in a direction from the lens array to the image carrier; and curing the curable adhesive to fix the spacer member to the holder.

BRIEF DESCRIPTION OF THE DRAWINGS

In the attached drawings:

FIGS. 5A to 5D are perspective views (including sectional views) illustrating a process of producing abutment members of the optical print head according to the first embodiment;

FIGS. 6A to 6E are sectional views illustrating the process of producing an abutment member of the optical print head according to the first embodiment;

FIG. 7A is a perspective view schematically illustrating a structure of an optical print head according to a modification of the first embodiment;

FIG. 7B is an enlarged perspective view of the part 7C in FIG. 7A;

FIG. 7C is an enlarged perspective view of the part 7C (including abutment members) in FIG. 7A;

FIG. 9A is a perspective view schematically illustrating a structure of an optical print head according to a second embodiment of the present invention;

FIG. 9B is an enlarged perspective view (including a sectional view) of the part 9B in FIG. 9A;

FIG. 9C is an enlarged perspective view (including a sectional view) of the part 9C in FIG. 9A;

FIG. 10A is a perspective view schematically illustrating a structure of an optical print head according to a modification of the second embodiment;

FIG. 10B is an enlarged perspective view (including a sectional view) of the part 10B in FIG. 10A;

FIG. 10C is an enlarged perspective view (including a sectional view) of the part 10C in FIG. 10A;

FIG. 11A is a perspective view schematically illustrating a structure of an optical print head according to a third embodiment of the present invention;

FIG. 11B is an enlarged perspective view of the part 11B in FIG. 11A;

FIG. 11C is an enlarged perspective view (including a sectional view) of the part 11B in FIG. 11A;

FIG. 11D is an enlarged perspective view (including a sectional view) of the part enclosed by the dashed line in FIG. 11C;

FIG. 13A is a perspective view schematically illustrating a structure of an optical print head according to a modification of the third embodiment;

FIG. 13B is an enlarged perspective view of the part 13B in FIG. 13A;

FIG. 13C is an enlarged perspective view (including a sectional view) of the part 13B in FIG. 13A;

FIG. 13D is an enlarged perspective view (including a sectional view) of the part enclosed by the dashed line in FIG. 13C;

FIG. 15 is a sectional view schematically illustrating a structure of an optical print head according to a fourth embodiment of the present invention;

DETAILED DESCRIPTION OF THE INVENTION

Figure 1A:
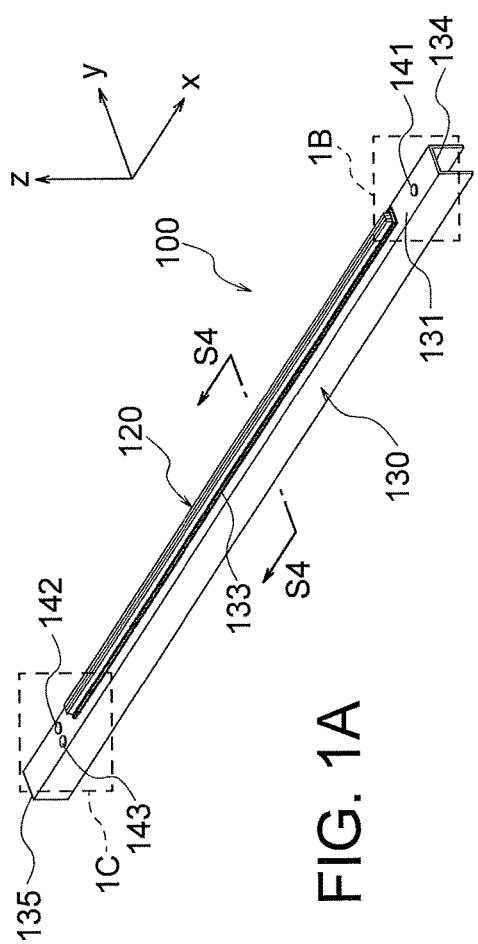
FIG. 1A is a perspective view schematically illustrating a structure of an optical print head according to a first embodiment of the present invention.

Optical print heads according to embodiments of the present invention, an image forming apparatus including optical print heads, and methods of manufacturing optical print heads will be described below with reference to the attached drawings. The drawings show the coordinate axes of an xyz orthogonal coordinate system. The x-axis is a coordinate axis in a longitudinal direction (or main scanning direction) of the optical print heads according to the embodiments. The y-axis is a coordinate axis in a width direction (or sub scanning direction) of the optical print heads. The z-axis is a coordinate axis in a direction in which the optical print heads emit light. In the drawings, like elements are given like reference characters.

1 First Embodiment

<1-1> Structure

Figure 1C:
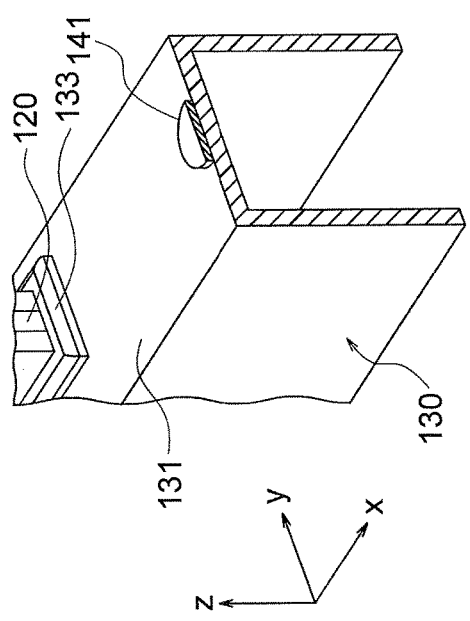
FIG. 1C is an enlarged perspective view (including a sectional view) of the part 1C in FIG. 1A.
Figure 1B:
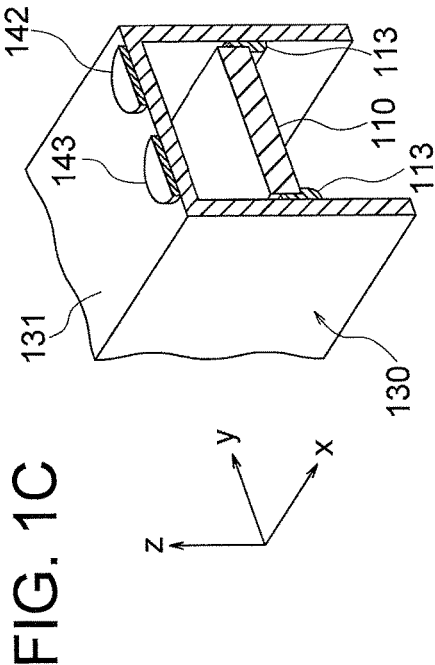
FIG. 1B is an enlarged perspective view (including a sectional view) of the part 1B in FIG. 1A.
Figure 2:
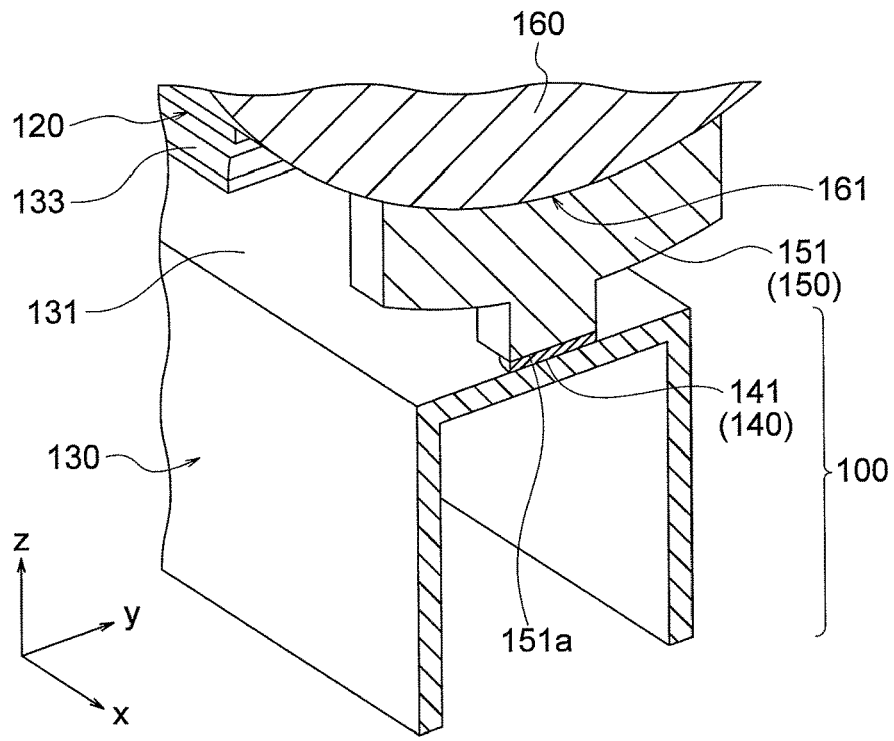
FIG. 2 is a perspective view (including a sectional view of the part 1B in FIG. 1A) schematically illustrating an optical print head according to the first embodiment, a spacer, and a photosensitive drum.
Figure 3:
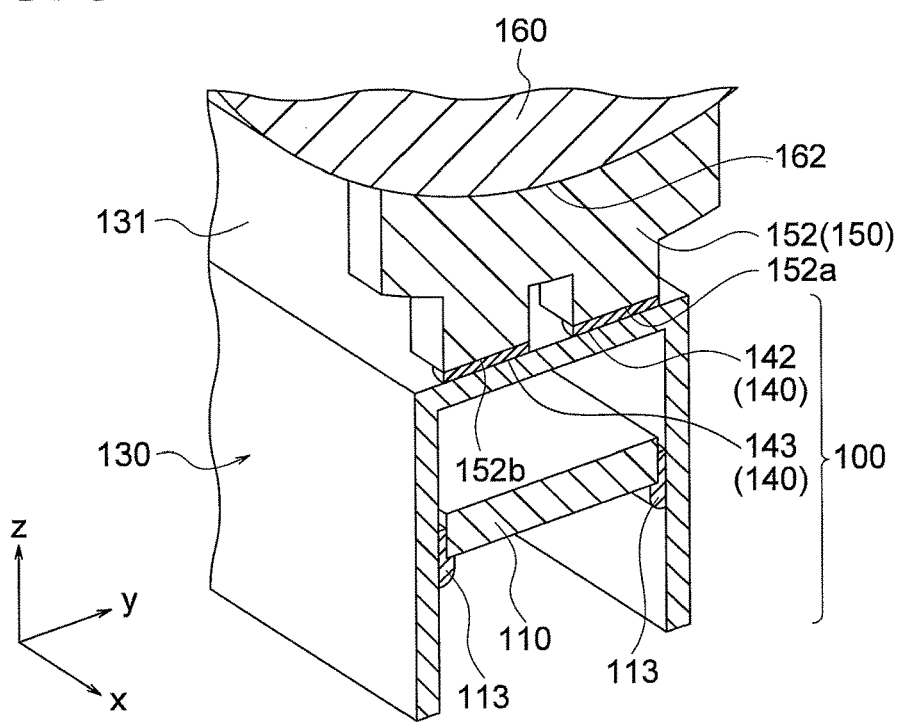
FIG. 3 is a perspective view (including a sectional view of the part 1C in FIG. 1A) schematically illustrating the optical print head according to the first embodiment, a spacer, and the photosensitive drum.
Figure 4:
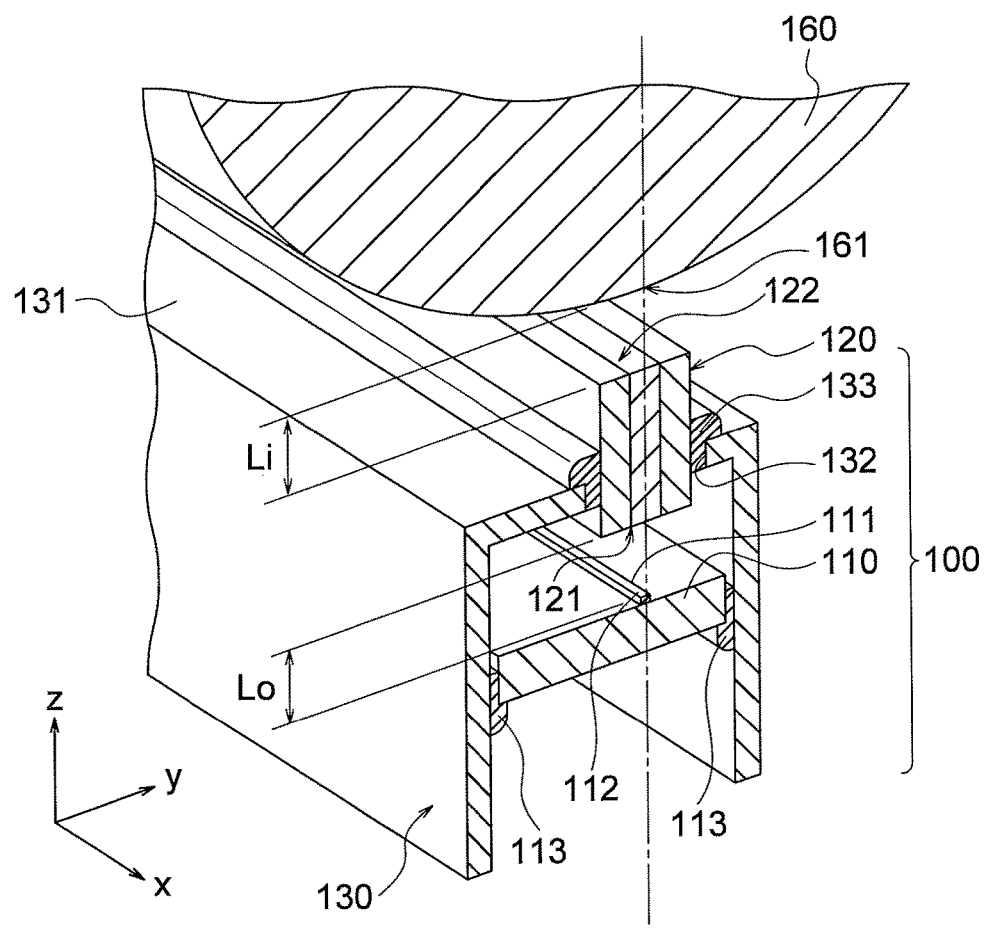
FIG. 4 is a perspective view (including a sectional view taken along line S4-S4 in FIG. 1A) schematically illustrating the optical print head according to the first embodiment and the photosensitive drum.

FIG. 1A is a perspective view schematically illustrating a structure of an optical print head 100 according to the first embodiment of the present invention. FIG. 1B is an enlarged perspective view (including a sectional view) of the part 1B in FIG. 1A. FIG. 1C is an enlarged perspective view (including a sectional view) of the part 1C in FIG. 1A. FIG. 2 is a perspective view (including a sectional view of the part 1B) schematically illustrating the optical print head 100, a spacer 151 as a distance reference member, and a photosensitive drum 160 as an image carrier. FIG. 3 is a perspective view (including a sectional view of the part 1C) schematically illustrating the optical print head 100, a spacer 152, and the photosensitive drum 160. FIG. 4 is a perspective view (including a sectional view taken along line S4-S4 in FIG. 1A) schematically illustrating the optical print head 100 and photosensitive drum 160.

As illustrated in FIGS. 2 to 4, the optical print head 100 is an exposure device for illuminating a surface 161 of the photosensitive drum 160 that faces the optical print head 100. In this embodiment, the photosensitive drum 160 is disposed to face the optical print head 100 via the pair of spacers 151 and 152. As illustrated in FIG. 4, the optical print head 100 includes a mounting substrate (or board) 110 on which a light emitting element array 111 is mounted, a lens array 120 that focuses or images light emitted from the light emitting element array 111 onto the surface 161 of the photosensitive drum 160, and a holder (or lens holder) 130 as a holding member that holds the mounting substrate 110 and lens array 120. The light emitting array 111, which may be composed of multiple light emitting element array chips, includes multiple light emitting elements arranged in the x direction. The lens array 120 is, for example, a microlens array including multiple microlenses (e.g., erecting equal magnification imaging lenses) arranged in a regular manner. An example of the lens array 120 is a Selfoc (registered trademark) lens array (SLA), which is a rod lens array. As illustrated in FIG. 4, the lens array 120 has a first surface 121 and a second surface 122. The first surface 121 is an end surface (or back surface) on the light emitting element array 111 side of the lens array 120 and is a light incident surface. The second surface 122 is an end surface (or front surface) on the photosensitive drum 160 side of the lens array 120 and is a light emitting surface.

The optical print head 100 includes at least one spacer member for maintaining a predetermined distance between the lens array 120 and the photosensitive drum 160. In this embodiment, as illustrated in FIGS. 1A to 1C, the optical print head 100 includes, as the at least one spacer member, abutment members 140 (141, 142, and 143) as first, second, and third spacer members that are made of resin and disposed on the holder 130. The abutment members 141, 142, and 143 constitute an abutment portion. As illustrated in FIG. 2, the abutment member 141 as the first spacer member abuts an end 151a of the spacer 151 on the −z side. As illustrated in FIG. 3, the abutment member 142 as the second spacer member and the abutment member 143 as the third spacer member abut ends 152a and 152b of the spacer 152 on the −z side, respectively. The abutment members 141, 142, and 143 and the spacers 151 and 152, which slide on the surface 161 of the photosensitive drum 160, set or define a clearance or distance Li (shown in FIG. 4) between the second surface 122 of the lens array 120 and the surface 161 of the photosensitive drum 160. Specifically, the abutment members 141, 142, and 143 are made of, for example, curable resin, such as ultraviolet (UV) curable resin. The abutment members 141, 142, and 143 are formed by placing resin materials (or bodies of resin material), adjusting or setting thicknesses of the resin materials before being cured to proper values while observing images or optical images of the light emitting elements at a position corresponding to the surface 161 of the photosensitive drum 160 by an optical image measurement device (specifically, adjusting the thicknesses of the resin materials so that the observed optical image is proper), irradiating the resin materials having the properly adjusted thicknesses with ultraviolet light to cure the resin materials, and thereby forming cured products of the resin materials as the abutment members 141, 142, and 143. The UV curable resin may be acrylic resin material, epoxy resin material, or other materials. The UV curable resin preferably has a glass transition temperature of 50° C. or higher. A method of adjusting the clearance Li will be described later in detail with reference to FIGS. 5A to 5D and 6A to 6E.

The holder 130 has a support surface (or lens support surface) 131 that faces the photosensitive drum 160, and an opening (or slit) 132 formed in the support surface 131 and elongated in the x direction. The opening 132 is a through hole in which the lens array 120 is inserted. The lens array 120 is inserted in the opening 132 with its longitudinal direction parallel to the x direction, and is fixed to the support surface 131 with adhesive (e.g., UV adhesive). To prevent foreign matter, such as toner, from entering the inside (or light emitting element array 111 side) of the holder 130, it is preferable to provide a sealing member 133 around the lens array 120 to seal the opening 132 in the holder 130. The sealing member 133 is, for example, silicone-based.

As illustrated in FIGS. 1A, 1B, 2, and 3, in the first embodiment, the holder 130 has ends 134 and 135; the abutment member 141 is formed (or fixed) on the support surface 131 on the end 134 side; the abutment members 142 and 143 are formed (or fixed) on the support surface 131 on the end 135 side. The abutment members 142 and 143 are aligned in the y direction on the support surface 131. The clearance (or distance) Li between the lens array 120 and the photosensitive drum 160 is set or defined by the abutment members 141, 142, and 143 at the three points. This can prevent rotational displacement (or rattling) of the optical print head 100 about a virtual axis in the x direction. The abutment members 142 and 143 may be formed at different positions in the x direction.

As illustrated in FIGS. 1B, 1C, 2, and 3, in the first embodiment, the abutment members 141, 142, and 143 are formed directly on the support surface 131 of the holder 130. The abutment members 141, 142, and 143 have thicknesses (in the z direction) of, for example, 1 mm or less.

The holder 130 has, for example, a sheet-metal structure formed by processing (e.g., boring and folding) a metal sheet. Instead of the processed metal sheet, the holder 130 may be formed of polycarbonate, acrylonitrile-butadiene-styrene (ABS) resin, or liquid crystal polymer, or may be formed by aluminum die casting.

The mounting substrate 110 is, for example, a chip-on-board (COB) produced by mounting the light emitting element array (e.g., multiple aligned light emitting element array chips) 111 on a printed wiring board via die bonding paste. The printed wiring board, which is the main component of the mounting substrate 110, is formed by patterning a copper-clad laminate having a glass epoxy resin board as a core material. The light emitting element array 111 is, for example, a light emitting diode (LED) array including multiple LEDs or an organic electroluminescence (EL) array including multiple organic EL elements. Specifically, the light emitting element array 111 may be, for example, an LED array formed using single crystal semiconductor mainly composed of GaAs (gallium arsenide), or an LED array formed using single crystal semiconductor mainly composed of GaN (gallium nitride). The mounting substrate 110 is positioned and fixed on an inner wall of the holder 130 with adhesive (e.g., UV adhesive) so that a light emitting surface of the light emitting element array 111 faces the first surface 121 of the lens array 120 with a clearance (or distance) Lo therebetween. The mounting substrate 110 may be fixed to the holder 130 in other ways. For example, the mounting substrate 110 may be sandwiched and held by the inner wall of the holder 130 in the width direction (or y direction).

The mounting substrate 110 and lens array 120 are fixed to the holder 130 so that the clearance (or distance) Li between the second surface (or front surface) 122 of the lens array 120 and the surface 161 of the photosensitive drum 160 is equal (or substantially equal) to the clearance (or distance) Lo between the first surface (or back surface) 121 of the lens array 120 and the light emitting surface (or front surface) of the light emitting element array 111 after the thicknesses of the abutment members 141, 142, and 143 have been set (or adjusted). Due to variation in the focal length of the lens array 120, variation in the position at which the mounting substrate 110 is fixed, variation in the flatness of the support surface 131 of the holder 130, and other reasons, an image position on the surface 161 of the photosensitive drum 160 is slightly displaced from a designed position. To allow the abutment members 141, 142, and 143 to function as a focal point (or image position) adjustment mechanism, the lens array 120 and mounting substrate 110 are fixed to the holder 130 so that the distance Li is slightly smaller than the distance Lo before the abutment members 141, 142, and 143 are formed. The abutment members 141, 142, and 143 are formed directly on the support surface 131 of the holder 130 by adjusting, while observing the image position using an optical image measurement device (not illustrated), the distance Li so that light emitted from the light emitting element array 111 is imaged at a position of the surface 161 of the photosensitive drum 160, and curing resin materials for the abutment members while maintaining the adjusted distance Li. To prevent foreign matter, such as toner, from adhering to the light emitting surface of the light emitting element array 111, a gap between the lens array 120 and the holder 130 is sealed by means of the sealing member 133. The sealing member 133 is, for example, silicone-based.

<1-2> Manufacturing Method

A method of manufacturing the optical print head 100 for illuminating the photosensitive drum 160 that faces the optical print head 100 will be described. First, UV curable resins (or bodies of UV curable resin), which are curable resins before being cured, are placed at positions where the abutment members 141, 142, and 143 are to abut the holder 130, on the holder 130 holding the mounting substrate 110 on which the light emitting element array 111 is mounted, and the lens array 120 for focusing light emitted from the light emitting element array 111. Then, heights of the UV curable resins in a direction from the lens array 120 to the photosensitive drum 160 are adjusted. Specifically, an image imaged by the lens array 120 is observed by the optical image measurement device (or observation device), and the thicknesses of the UV curable resins are adjusted on the basis of the observed image. Then, the UV curable resins are cured to form cured products having the adjusted heights as the abutment members 141, 142, and 143.

A method of setting or adjusting the thicknesses of the abutment members 141, 142, and 143 will now be described in detail. FIGS. 5A to 5D are perspective views (including sectional views) illustrating a process of producing the abutment members 141, 142, and 143 of the optical print head 100 according to the first embodiment. FIG. 5C is an enlarged perspective view of the part 5B in FIG. 5B. First, the lens array 120 and mounting substrate 110 are fixed to the holder 130, and the sealing member 133 and a sealing member 113 are provided to seal the periphery of the lens array 120 and a back surface of the mounting substrate 110. Moreover, as illustrated in FIG. 5A, to seal ends of the mounting substrate 110 in the x direction, sealing plates 114 are disposed in contact with the ends of the mounting substrate 110.

Next, as illustrated in FIG. 5A, the optical print head 100 is set so that it is supported by a spring 172 supported by a spring guide 171, from a back side of the holder 130. Then, a UV curable resin 141a for forming the abutment member 141 is dispensed (or supplied) to a position facing the spacer 151 on the support surface 131 of the holder 130. Likewise, UV curable resins (not illustrated) for forming the abutment members 141 and 142 are dispensed to two positions facing the spacer 152 on the support surface 131 of the holder 130. At this time, the heights (or thicknesses in the z direction) of the UV curable resins are preferably greater than final heights (or thicknesses) of the abutment members 141, 142, and 143. Further, since the UV curable resins before being cured are pressed by an abutment plate 174 in a later step for adjusting their heights, it is preferable to adjust the amounts of the UV curable resins to prevent the UV curable resins from protruding outside the holder 130 in the sub scanning direction (or y direction).

Next, as illustrated in FIG. 5B, the optical print head 100 is pushed up in the +z direction by the spring 172 so that the support surface 131 of the holder 130 abuts an end 173a on the −z side of a height adjustment pin 173. At this time, the UV curable resins before being cured are pressed by the abutment plate 174 into plate shapes. To allow the UV curable resins to easily separate from the abutment plate 174 after UV curing, a release surface 175 is formed on a lower surface of the abutment plate 174. The release surface 175 may be formed by coating a surface (or the lower surface in FIG. 5B) of the abutment plate 174 with silicone or fluororesin. The release surface 175 is a surface against which the UV curable resins abut, as illustrated in FIG. 5B. The height (or position in the z direction) of the release surface 175 corresponds to the position of ends (the end 151a in FIG. 2 and the ends 152a and 152b in FIG. 3) on the −z side of the spacers 151 and 152 abutting an outer periphery of the photosensitive drum 160. As illustrated in FIG. 5B, a height (or position in the z direction) of a virtual position (indicated by the dashed-dotted line in FIG. 5B) 176 of the surface 161 of the photosensitive drum 160 in the optical image measurement device corresponds to a height (or position in the z direction) of the surface 161 of the photosensitive drum 160 in an image forming apparatus. Then, by moving up and down (in the +z and −z directions) the height adjustment pin 173 while observing the imaging state using the optical image measurement device, the distance Li from the virtual position 176 of the surface 161 of the photosensitive drum 160 to the second surface 122 of the lens array 120 is adjusted so that the light is imaged or focused at the virtual position 176 of the surface 161 of the photosensitive drum 160.

Then, by irradiating the UV curable resins with UV light from a UV light source 177 through the abutment plate 174 while maintaining the adjusted distance Li, the UV curable resins are cured into cured products as the abutment members 141, 142, and 143. To irradiate the UV curable resins with UV light through the abutment plate 174, the abutment plate 174 is preferably formed of transparent material (e.g., transparent glass).

Next, as illustrated in FIG. 5D, the abutment members 141, 142, and 143 are separated from the release surface 175.

FIGS. 6A to 6E are sectional views illustrating the process of producing the abutment member 141 of the optical print head 100 according to the first embodiment. First, as illustrated in FIG. 6A, a UV curable resin (or a body of UV curable resin) 141a is dispensed onto the support surface 131 of the holder 130 using a dispenser. This step corresponds to the step of FIG. 5A.

Next, as illustrated in FIG. 6B or 6C, the release surface 175 of the abutment plate 174 is brought into contact with the UV curable resin 141a. The thickness of the UV curable resin 141a may be adjusted by moving the holder 130 up in the +z direction (or one direction) as illustrated in FIG. 6B, or by moving the holder 130 in the +z and −z directions (or up and down directions) as illustrated in FIGS. 6C. In the case of FIG. 6B, when the holder 130 is moved up in one direction, the UV curable resin 141a is pressed and crushed against the release surface 175 to have a height (or thickness) equal to a length of a gap between the release surface 175 and the holder 130. In the case of FIG. 6C, after the UV curable resin 141a is moved in the +z direction and greatly crushed against the release surface 175, the height of the UV curable resin 141a is adjusted by moving the holder 130 away from the release surface 175. At this time, the surface tension of the UV curable resin 141a relative to the release surface 175 allows the UV curable resin 141a to follow the movement of the holder 130 in the up and down directions while being attracted by the release surface 175. When it is difficult to ensure the final height of the abutment member 141 (or the thickness of the UV curable resin 141a in FIG. 6D) due to variation in the height of the UV curable resin 141a (or the thickness of the UV curable resin 141a in FIG. 6A), it is preferable to employ the method of FIG. 6C.

Next, as illustrated in FIG. 6D, while the adjusted height (or thickness) of the UV curable resin 141a is maintained, the UV curable resin 141a is irradiated with UV light from the UV light source 177 through the abutment plate 174 and thereby cured. The steps of FIGS. 6B to 6D correspond to the step of FIG. 5B.

Next, as illustrated in FIG. 6E, the holder 130 is moved in the −z direction, and thereby the abutment member 141 is separated from the release surface 175. The abutment members 142 and 143 are formed in the same manner as the abutment member 141.

<1-3> Advantages

In the optical print head 100 according to the first embodiment, the abutment portion of the optical print head 100 that abuts the spacers 151 and 152 can be constituted by the abutment members 141, 142, and 143 made of resin. Further, the abutment members 141, 142, and 143 can be formed directly on the support surface 131 of the holder 130. This can reduce the number of parts as compared to the prior art. This can reduce the assembly time.

Further, in the optical print head 100 according to the first embodiment, the abutment members 141, 142, and 143 can be formed (or fixed) directly on a flat portion of the support surface 131 of the holder 130. This can allow the holder 130 to be a simple sheet-metal structure, thereby reducing the cost of the optical print head as compared to the prior art, which requires processing of a holder for installation of an adjustment member.

Further, in the optical print head 100 according to the first embodiment, the abutment members 141, 142, and 143 are formed by supplying UV curable resins directly onto the support surface 131 of the holder 130 and curing the UV curable resins. This can reduce the number of manufacturing steps as compared to a method including a step of supplying adhesive to an adjustment member after adjustment of the distance Li. This can reduce the cost of the optical print head.

Further, in the optical print head 100 according to the first embodiment, the abutment members 141, 142, and 143 can be formed on the holder 130 to have very small thicknesses, e.g., of 1 mm or less. This can reduce variation in the distance Li between the photosensitive drum 160 and the lens array 120 due to variation in the ambient temperature of the optical print head as compared to the prior art. This can stabilize characteristics of the optical print head.

<1-4> Modification

Figure 8:
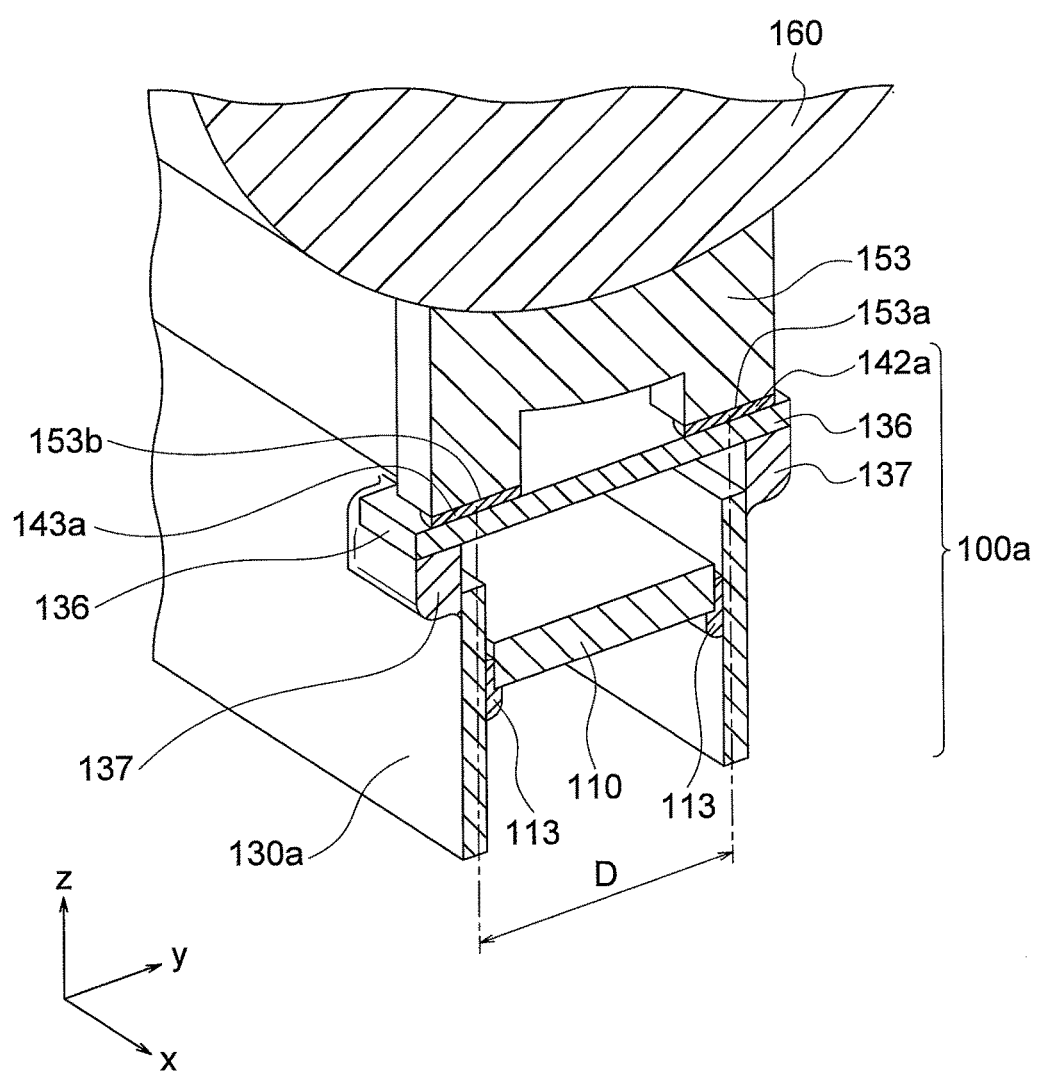
FIG. 8 is a perspective view (including a sectional view of the part 7C in FIG. 7A) schematically illustrating the optical print head according to the modification of the first embodiment, a spacer, and a photosensitive drum.

FIG. 7A is a perspective view schematically illustrating a structure of an optical print head 100a according to a modification of the first embodiment. FIGS. 7B and 7C are enlarged perspective views of the part 7C in FIG. 7A. FIG. 7C illustrates abutment members, which are not illustrated in FIG. 7B. In FIGS. 7A to 7C, elements that are the same as or correspond to those in FIGS. 1A and 1C have the same reference characters. FIG. 8 is a perspective view schematically illustrating the optical print head 100a according to the modification of the first embodiment, a spacer 153, and the photosensitive drum 160. FIG. 8 includes a sectional view of the part 7C in FIG. 7A. In FIG. 8, elements that are the same as or correspond to those in FIG. 3 have the same reference characters.

The optical print head 100a according to the modification of the first embodiment differs from the optical print head 100 according to the first embodiment in that, while the support surface 131 has a constant width, the support surface 131a of the holder 130a has, on the end 135 side, a wide portion (or protruding portion) 136, and abutment members 142a and 143a made of resin are disposed near both ends of the wide portion 136 in the width direction (or y direction). The abutment members 142a and 143a of the optical print head 100a are the same as the abutment members 142 and 143 of the optical print head 100 except that they are disposed at the both ends of the wide portion 136 in the support surface 131a of the holder 130a. The distance D between center positions of the abutment members 142a and 143a of the optical print head 100a is greater than the distance between center positions of the abutment members 142 and 143 of the optical print head 100. The spacer 153, which is disposed between the optical print head 100a and the photosensitive drum 160, has ends 153a and 153b on the −z side, at positions corresponding to the positions of the abutment members 142a and 143a.

In the modification of the first embodiment, the abutment member 141 is formed (or fixed) on the support surface 131a on the end 134 side of the holder 130a. As illustrated in FIGS. 7A and 7C, the abutment members 142a and 143a are formed (or fixed) on the support surface 131a on the end 135 side of the holder 130a. The abutment members 142a and 143a are also aligned in the y direction on the support surface 131a. The clearance (or distance) Li between the lens array 120 and the photosensitive drum 160 is set or defined by the abutment members 141, 142a, and 143a at the three points. This can prevent rattling of the optical print head 100a. The abutment members 142a and 143a may be located at different positions in the x direction.

As described above, in the optical print head 100a according to the modification of the first embodiment, the distance D between the center positions of the abutment members 142a and 143a is great. This can further prevent rotational displacement (or rattling) of the optical print head 100a about a virtual axis in the x direction.

Except for the above, the optical print head 100a according to the modification is the same as the optical print head 100.

The abutment members 142 and 143 of the optical print head 100 may be replaced with a single abutment member elongated in the y direction. Likewise, the abutment members 142a and 143a of the optical print head 100a may be replaced with a single abutment member elongated in the y direction.

2 Second Embodiment

<2-1> Structure

FIG. 9A is a perspective view schematically illustrating a structure of an optical print head 200 according to a second embodiment of the present invention. FIG. 9B is an enlarged perspective view (including a sectional view) of the part 9B in FIG. 9A. FIG. 9C is an enlarged perspective view (including a sectional view) of the part 9C in FIG. 9A. In FIGS. 9A to 9C, elements that are the same as or correspond to those in FIGS. 1A to 1C have the same reference characters. The optical print head 200 according to the second embodiment differs from the optical print head 100 according to the first embodiment in that a holder 230 has through holes 231a, 231b, and 231c at positions where abutment members 241, 242, and 243 are formed on a support surface 231, and the abutment members 241, 242, and 243 are formed on the through holes 231a, 231b, and 231c in such a manner as to fill the through holes 231a, 231b, and 231c. The through holes 231a, 231b, and 231c may have diameters of, for example, 2 mm or less.

The abutment member 241 as a first spacer member, the abutment member 242 as a second spacer member, and the abutment member 243 as a third spacer member, which are formed on the support surface 231 of the holder 230 of the optical print head 200, have the same functions as the abutment members 141, 142, and 143 of the first embodiment. The abutment members 241, 242, and 243 can be formed by, for example, dispensing UV curable resins, which are curable resins before being cured, to the through holes 231a, 231b, and 231c in the holder 230 by a dispenser, and then curing the UV curable resins in the same manner as the steps illustrated in FIGS. 5A to 5D and 6A to 6E. To prevent the UV curable resin before being cured from passing through the through holes 231a, 231b, and 231c and scattering onto an upper surface of the mounting substrate (or COB) 110, an opening diameter of a dispensing nozzle of the dispenser for supplying UV curable resin before being cured is preferably greater than diameters of the through holes 231a, 231b, and 231c.

<2-2> Advantages

In the optical print head 200 according to the second embodiment, the abutment members 241, 242, and 243 are formed and cured in such a manner as to fit into the through holes 231a, 231b, and 231c in the holder 230. This can improve the strength of the abutment members 241, 242, and 243 against a shear force in a lateral direction (or a direction parallel to the support surface 231).

In the optical print head 200 according to the second embodiment, the abutment portion of the optical print head 200 that abuts the spacers can be constituted by the abutment members 241, 242, and 243 made of resin. Further, the abutment members 241, 242, and 243 can be formed on the support surface 231 of the holder 230. This can reduce the number of parts as compared to the prior art. This can reduce the assembly time.

Further, in the optical print head 200 according to the second embodiment, the abutment members 241, 242, and 243 can be formed (or fixed) directly on the support surface 231 of the holder 230 at positions of the through holes 231a, 231b, and 231c. This can allow the holder 230 to be a simple sheet-metal structure. This can reduce the cost of the optical print head as compared to the prior art, which requires processing of a holder for installation of an adjustment member.

Further, in the optical print head 200 according to the second embodiment, the abutment members 241, 242, and 243 are formed by supplying UV curable resins directly onto the support surface 231 of the holder 230 and curing the UV curable resins. This can reduce the number of manufacturing steps as compared to a method including a step of supplying adhesive to an adjustment member after adjustment of the distance Li. This can reduce the cost of the optical print head.

Further, in the optical print head 200 according to the second embodiment, the abutment members 241, 242, and 243 can be formed on the holder 230 to have very small thicknesses. This can reduce variation in the distance Li between the photosensitive drum 160 and the lens array 120 due to variation in the ambient temperature of the optical print head as compared to the prior art. This can stabilize characteristics of the optical print head.

<2-3> Modification

FIG. 10A is a perspective view schematically illustrating a structure of an optical print head 200a according to a modification of the second embodiment. FIG. 10B is an enlarged perspective view (including a sectional view) of the part 10B in FIG. 10A. FIG. 10C is an enlarged perspective view (including a sectional view) of the part 10C in FIG. 10A. In FIGS. 10A to 10C, elements that are the same as or correspond to those in FIGS. 9A to 9C have the same reference characters. The optical print head 200a according to the modification of the second embodiment differs from the optical print head 200 according to the second embodiment in that a holder 230a has recesses 232a, 232b, and 232c at positions where abutment members 241a, 242a, and 243a are formed on a support surface 232, and the abutment members 241a, 242a, and 243a are formed to fill the recesses 232a, 232b, and 232c.

The abutment members 241a, 242a, and 243a, which are formed on the support surface 232 of the holder 230a of the optical print head 200a, have the same functions as the abutment members 141, 142, and 143 of the first embodiment. The abutment members 241a, 242a, and 243a can be formed by, for example, dispensing UV curable resins before being cured to the recesses 232a, 232b, and 232c in the support surface 232 of the holder 230a by a dispenser, and then curing the UV curable resins in the same manner as the steps illustrated in FIGS. 5A to 5D and 6A to 6E. The abutment members 241a, 242a, and 243a made of the UV curable resin have diameters greater than the recesses 232a, 232b, and 232c, and are formed to fill the recesses 232a, 232b, and 232c.

As described above, in the optical print head 200a according to the modification of the second embodiment, the recesses 232a, 232b, and 232c are formed in the support surface 232 of the holder 230a on which the abutment members 241a, 242a, and 243a are formed. Thus, when UV curable resin is dispensed to the recesses 232a, 232b, and 232c, no UV curable resin scatters onto a surface of the mounting substrate 110.

Except for the above, the optical print head 200a according to the modification is the same as the optical print head 200.

The through holes 231b and 231c of the optical print head 200 may be replaced with a single through hole, and the abutment members 242 and 243 may be replaced with a single abutment member elongated in the y direction. Likewise, the recesses 232b and 232c of the optical print head 200a may be replaced with a single recess, and the abutment members 242a and 243a may be replaced with a single abutment member elongated in the y direction.

Further, the optical print heads 200 and 200a may have a wide portion as illustrated in FIG. 7C.

The through holes 231a, 231b, and 231c of the optical print head 200 and the recesses 232a, 232b, and 232c of the optical print head 200a can be formed by applying extrusion processing to the holder 230 and 230a. The holder 230 and 230a may be formed by aluminum die casting or may be formed of resin, such as polycarbonate, ABS resin, or liquid crystal polymer.

3 Third Embodiment

<3-1> Structure

FIG. 11A is a perspective view schematically illustrating a structure of an optical print head 300 according to a third embodiment of the present invention. FIG. 11B is an enlarged perspective view of the part 11B in FIG. 11A. FIG. 11C is an enlarged perspective view (including a sectional view) of the part 11B in FIG. 11A. FIG. 11D is an enlarged perspective view (including a sectional view) of the part enclosed by the dashed line in FIG. 11C. In FIGS. 11A to 11D, elements that are the same as or correspond to those in FIGS. 1A to 1C have the same reference characters. The optical print head 300 according to the third embodiment differs from the optical print head 100 according to the first embodiment in that protective rings 343 and 344 are formed to surround an outer periphery of an abutment member 341 as a first spacer member and an outer periphery of an abutment member 342 as a second spacer member on a support surface 331 of a holder 330, respectively. The protective rings 343 and 344 are made using low modulus silicone material. As illustrated in FIG. 11A, the abutment member 342 has an elliptical shape elongated in the y direction as viewed in the z direction. However, the abutment member 342 and protective ring 344 may be replaced with two abutment members like the abutment members 142 and 143 in FIG. 1 and two protective rings made using low modulus silicone material. In this case, the two abutment members may have circular shapes as viewed in the z direction.

The abutment members 341 and 342 are formed by dispensing UV curable resins as curable resins directly onto the holder 330 and irradiating the UV curable resins with UV light to cure the UV curable resins. The method of forming the abutment members 341 and 342 is the same as that of the first embodiment illustrated in FIGS. 5A to 5D and 6A to 6E. The protective rings 343 and 344 are formed to surround the outer peripheries of the abutment members 341 and 342 and adhere to the support surface 331 of the holder 330.

Figure 12A:
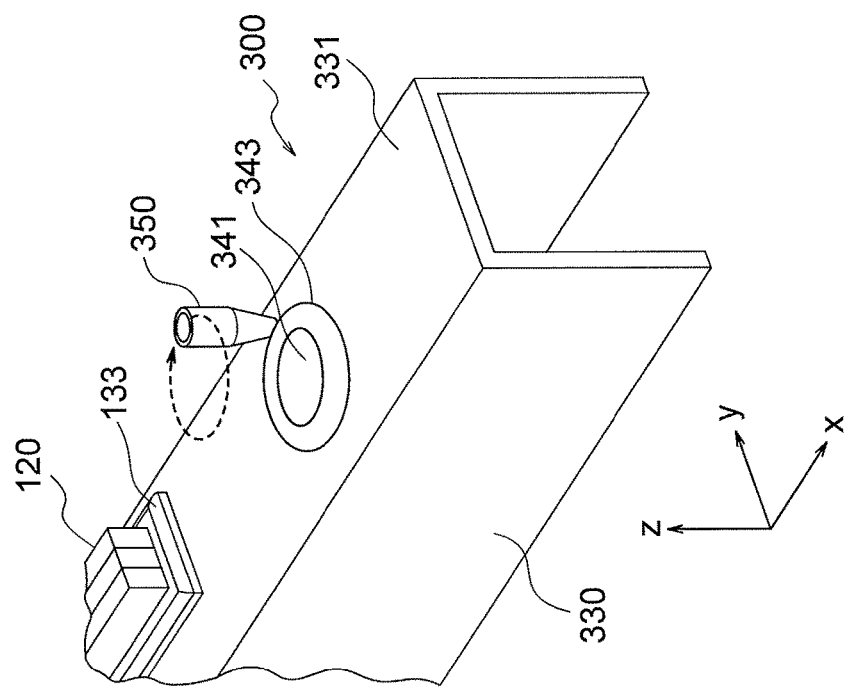
FIGS. 12A and 12B are perspective views illustrating a process of producing abutment member and protective ring of the optical print head according to the third embodiment.
Figure 12B:
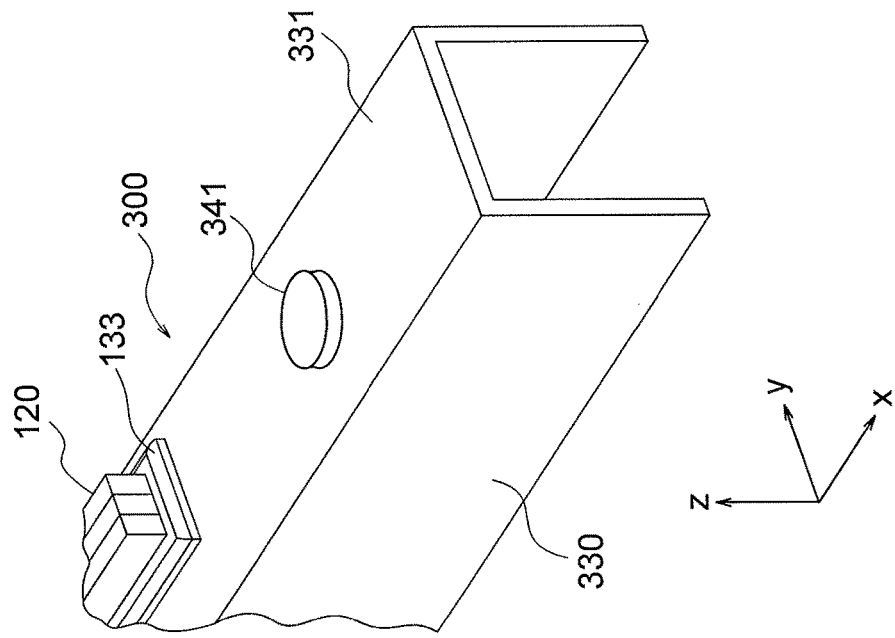

FIGS. 12A and 12B are perspective views illustrating a process of producing the abutment member 341 and protective ring 343 of the optical print head 300 according to the third embodiment. The abutment member 341 is formed on the support surface 331 of the holder 330 in the same manner as in the first embodiment. Then, the protective ring 343 is formed by dispensing (or supplying) low modulus silicone material from a dispensing nozzle 350 of a dispenser onto the support surface 331 while moving the dispensing nozzle 350 along the outer periphery of the abutment member 341. The abutment member 342 and protective ring 344 are formed in the same manner.

<3-2> Advantages

In the optical print head 300 according to the third embodiment, the protective rings 343 and 344 made of low modulus silicone are formed around the abutment members 341 and 342. Thereby, when the spacers, which are members corresponding to the spacers 151 and 152 in FIGS. 2 and 3, abut the abutment members 341 and 342, edges of the abutment members 341 and 342 are less likely to be damaged or chipped. Further, even if the abutment member 341 or 342 is broken to produce broken pieces, since the abutment members 341 and 342 are sealed by the protective rings 343 and 344, the broken pieces are less likely to scatter and adhere to a surface of the photosensitive drum 160.

The optical print head 300 according to the third embodiment can be composed of a smaller number of parts than the prior art. This can reduce the assembly time.

Further, in the optical print head 300 according to the third embodiment, the holder 330 can be a simple sheet-metal structure. This can reduce the cost as compared to the prior art.

Further, in the optical print head 300 according to the third embodiment, the abutment members 341 and 342 can be formed to be very thin. This can reduce variation in the distance Li between the photosensitive drum 160 and the lens array 120 due to temperature variation, thereby stabilizing characteristics of the optical print head.

<3-3> Modification

FIG. 13A is a perspective view schematically illustrating a structure of an optical print head 300a according to a modification of the third embodiment. FIG. 13B is an enlarged perspective view of the part 13B in FIG. 13A. FIG. 13C is an enlarged perspective view (including a sectional view) of the part 13B in FIG. 13A. FIG. 13D is an enlarged perspective view (including a sectional view) of the part enclosed by the dashed line in FIG. 13C. In FIGS. 13A to 13D, elements that are the same as or correspond to those in FIGS. 11A to 11D have the same reference characters. The optical print head 300a according to the modification of the third embodiment differs from the optical print head 300 according to the third embodiment in that a support surface 331a of a holder 330a has recesses (one of which is denoted by reference character 332 in FIGS. 13D and 14A), and abutment members 341a and 342a are formed in the recesses formed in the support surface 331a. As illustrated in FIG. 13A, the abutment member 342a has an elliptical shape elongated in the y direction as viewed in the z direction. However, the abutment member 342a and a protective ring 344a may be replaced with two abutment members like the abutment members 142 and 143 in FIG. 1 and two protective rings made using low modulus silicone material. In this case, the two abutment members may have circular shapes as viewed in the z direction.

In the optical print head 300a, the abutment members 341a and 342a are formed in the recesses in the support surface 331a of the holder 330a so that each of them adheres to a bottom surface of the corresponding recess and has a diameter smaller than a diameter of the bottom surface of the recess. The protective rings 343a and 344a are formed around the abutment members 341a and 342a to fill spaces in the recesses outside the abutment members 341a and 342a. The method of forming the abutment members 341a and 342a is the same as that of the first embodiment illustrated in FIGS. 5A to 5D and 6A to 6E.

Figure 14A:
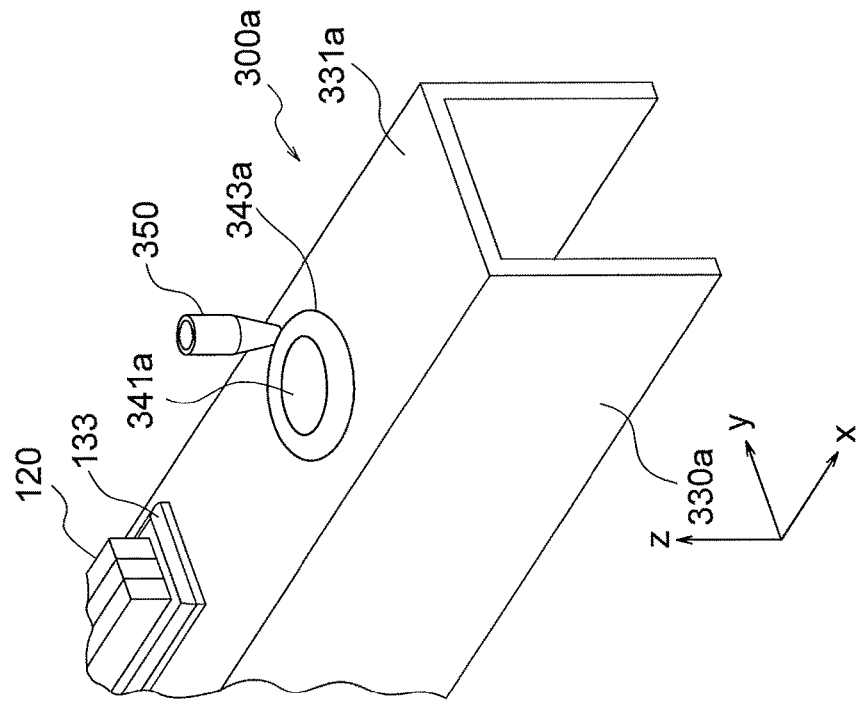
FIGS. 14A and 14B are perspective views illustrating a process of producing an abutment member and a protective ring of the optical print head according to the modification of the third embodiment.
Figure 14B:
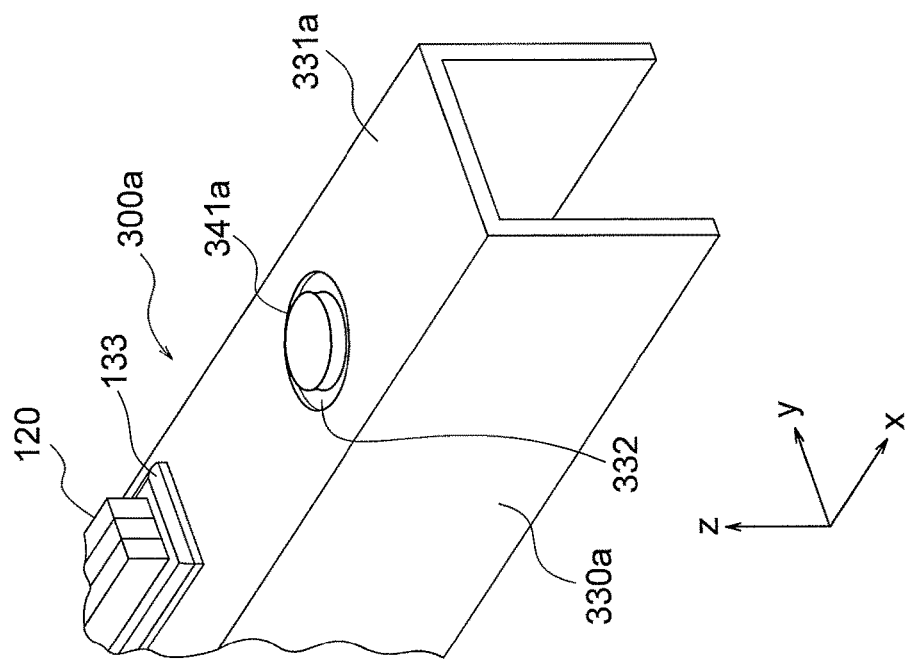

FIGS. 14A and 14B are perspective views illustrating a process of producing the abutment member 341a and protective ring 343a of the optical print head 300a according to the modification of the third embodiment. First, the recess 332 is formed by extrusion processing at a position where the abutment member 341a is to be formed, in the support surface 331a of the holder 330a. Then, the abutment member 341a is formed on the bottom surface of the recess 332. Then, the protective ring 343a is formed by dispensing low modulus silicone material from the dispensing nozzle 350 while moving the dispensing nozzle 350 along the outer periphery of the abutment member 341a. When the viscosity of the low modulus silicone material is extremely low (e.g., less than 5 Pa·s), it is possible to fill the space in the recess 332 around the abutment member 341a with the low modulus silicone material by taking advantage of flow of the low modulus silicone material without moving the dispensing nozzle 350 along the outer periphery of the abutment member 341a. The abutment member 342a and protective ring 344a are formed in the same manner.

As described above, in the optical print head 300a according to the modification of the third embodiment, the recesses are formed in the support surface 331a of the holder 330a on which the abutment members 341a and 342a are formed. Thus, when UV curable resin is dispensed in the recesses, the UV curable resin is less likely to scatter onto a surface of the mounting substrate 110.

Further, in the optical print head 300a, the protective rings 343a and 344a are formed of low modulus silicone to fill the spaces in the recesses outside the abutment members 341a and 342a. The protective rings can be formed in such a manner as to tightly adhere to the outer peripheries of the abutment members 341a and 342a. Further, when the viscosity of the low modulus silicone is extremely low, it is possible to form the protective rings 343a and 344a by taking advantage of flow of the low modulus silicone without moving the dispensing nozzle along the outer peripheries of the abutment members 341a and 342a.

Except for the above, the optical print head 300a according to the modification is the same as the optical print head 300.

The wide portion as illustrated in FIG. 7C can be applied to the optical print heads 300 and 300a. Also, the through holes and abutment members filling them illustrated in FIGS. 9A to 9C can be applied to the optical print heads 300 and 300a.

4 Fourth Embodiment

<4-1> Structure

Figure 16:
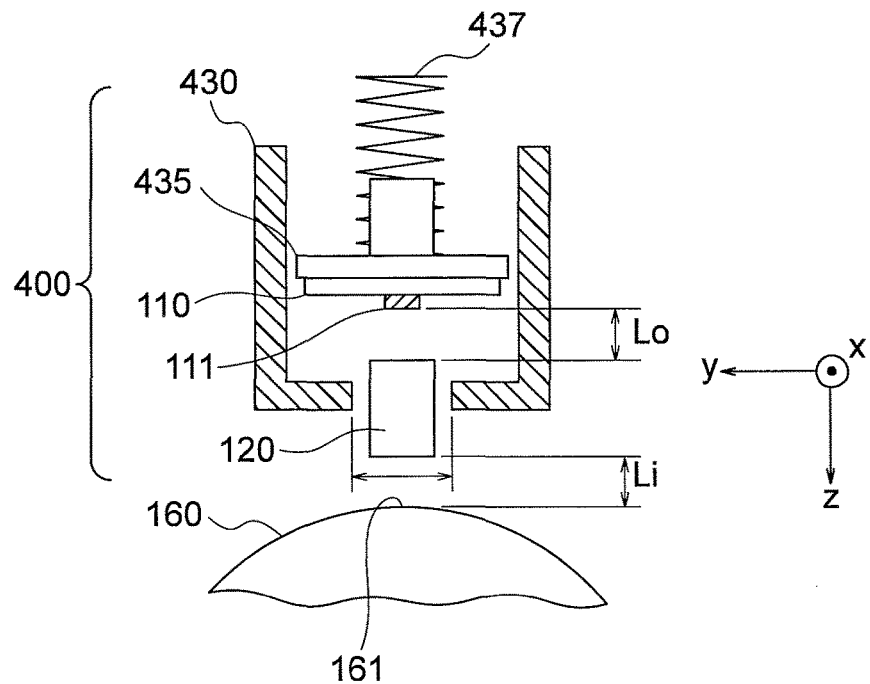
FIG. 16 is a sectional view taken along line S16-S16 in FIG. 15.
Figure 17:
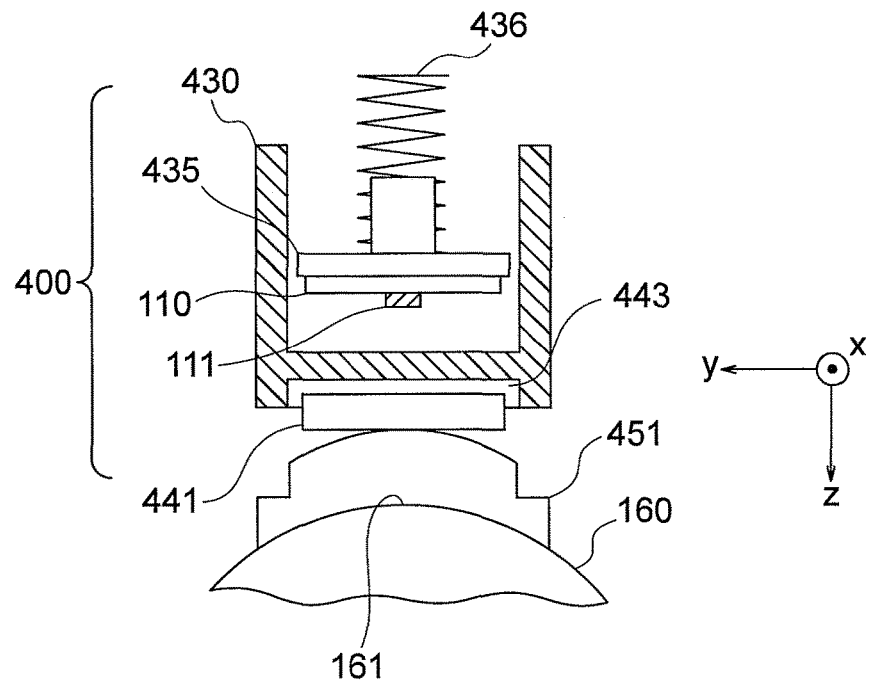
FIG. 17 is a sectional view taken along line S17-S17 in FIG. 15.
Figure 18:
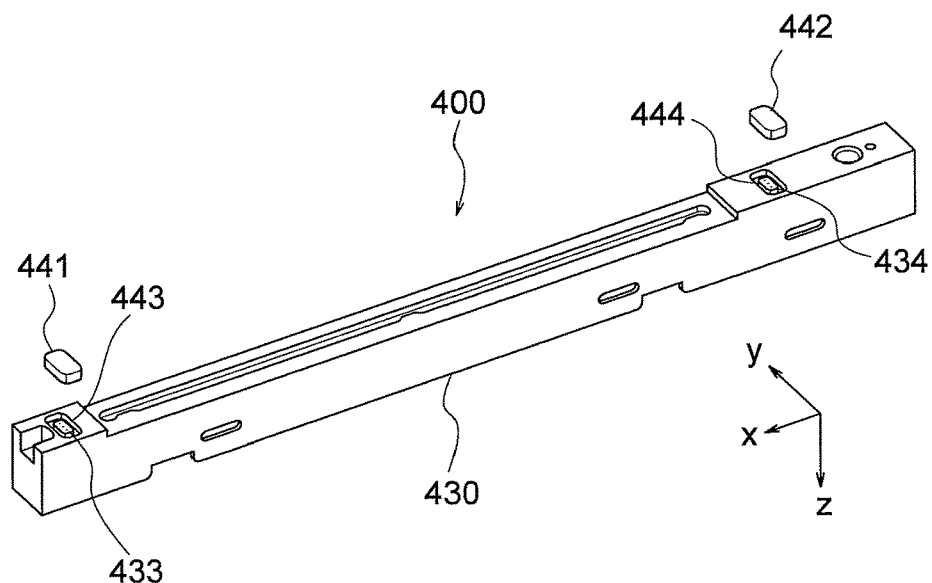
FIG. 18 is a perspective view schematically illustrating the structure of the optical print head according to the fourth embodiment.
Figure 19:
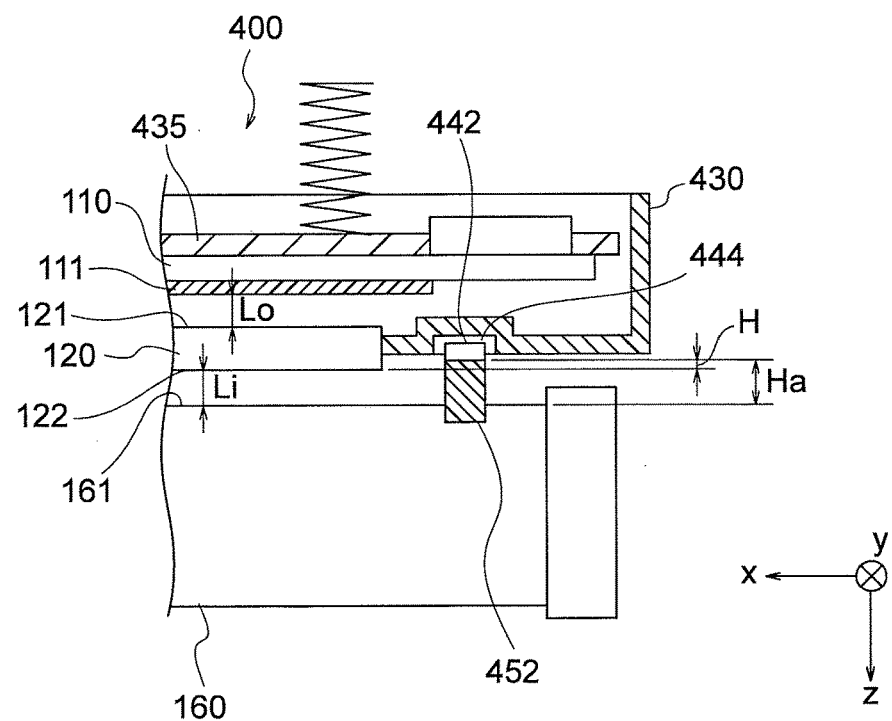
FIG. 19 is a sectional view schematically illustrating the structure of a main part of the optical print head according to the fourth embodiment.

FIG. 15 is a sectional view schematically illustrating a structure of an optical print head 400 according to a fourth embodiment of the present invention. FIG. 16 is a sectional view taken along line S16-S16 in FIG. 15. FIG. 17 is a sectional view taken along line S17-S17 in FIG. 15. FIG. 18 is a perspective view schematically illustrating the structure of the optical print head 400 according to the fourth embodiment. FIG. 19 is a sectional view schematically illustrating the structure of a main part of the optical print head 400 according to the fourth embodiment.

As illustrated in FIGS. 15 to 19, the optical print head 400 is an exposure device for illuminating the surface 161 of the photosensitive drum 160 that faces the optical print head 400 via spacers 451 and 452. The optical print head 400 includes the mounting substrate (or board) 110 on which the light emitting element array 111 is mounted, the lens array 120 that focuses light emitted from the light emitting element array 111 onto the surface 161 of the photosensitive drum 160, and a holder (or lens holder) 430 as a holding member that holds the mounting substrate 110 and lens array 120. The light emitting array 111 includes multiple light emitting elements arranged in the x direction.

The mounting substrate 110 is held by a base 435 disposed inside the holder 430. The holder 430 has an opening (or slot) 432 formed at a central part of a support surface 431 and elongated in the x direction. The lens array 120 is inserted in the opening 432. The lens array 120 is positioned so that the distance Lo between the surface of the light emitting element array 111 and the first surface 121 of the lens array 120 is an optimum distance for characteristics of the lens array 120 and is fixed to the holder 430 at the optimum position with adhesive.

To accurately focus or image light emitted from the light emitting element array 111 on the surface 161 of the photosensitive drum 160, it is necessary to adjust the distance Li between the second surface 122 of the lens array 120 and the surface 161 of the photosensitive drum 160 so that the distance Li is equal (or substantially equal) to the distance Lo between the light emitting surface of the light emitting element array 111 and the first surface 121 of the lens array 120, i.e., Lo=Li (or Lo≈Li when an error is taken into account). Thus, an abutment member 441 as a first spacer member and an abutment member 442 as a second spacer member are disposed at positions facing spacers 451 and 452 that abut (or are slidably in contact with) the surface 161 of the photosensitive drum 160. The abutment members 441 and 442 are disposed near both ends of the holder 430 in the longitudinal direction (or x direction). The abutment members 441 and 442 are made of resin. The abutment members 441 and 442 are plates as positioning members for adjusting the distance Li and positioning the holder 430 in the z direction. The spacers 451 and 452 are disposed to abut surfaces of the abutment members 441 and 442 and the surface 161 of the photosensitive drum 160. In the fourth embodiment, the distance Li between the surface 161 of the photosensitive drum 160 and the second surface 122 of the lens array 120 is set or defined by the spacers 451 and 452, the abutment members 441 and 442, and adhesives (or bodies of adhesive) 443 and 444.

Springs 436 and 437 as urging members are disposed near both ends of the holder 430 in the longitudinal direction (or x direction). The springs 436 and 437 urge the optical print head 400 in a direction (or the z direction) toward the photosensitive drum 160, and the abutment members 441 and 442 as positioning members are positioned and fixed with the UV curable adhesives 443 and 444, which are adhesives made of curable resin, so that Lo=Li (or Lo≈Li when an error is taken into account).

<4-2> Manufacturing Method

A method of manufacturing the optical print head 400 for illuminating the photosensitive drum 160 that faces the optical print head 400.

Figure 20A:
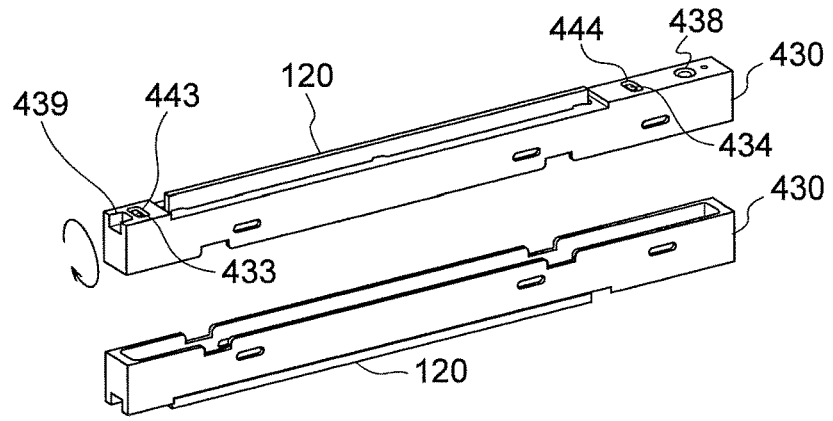
FIG. 20A is a perspective view schematically illustrating a structure of the optical print head according to the fourth embodiment.
Figure 20B:
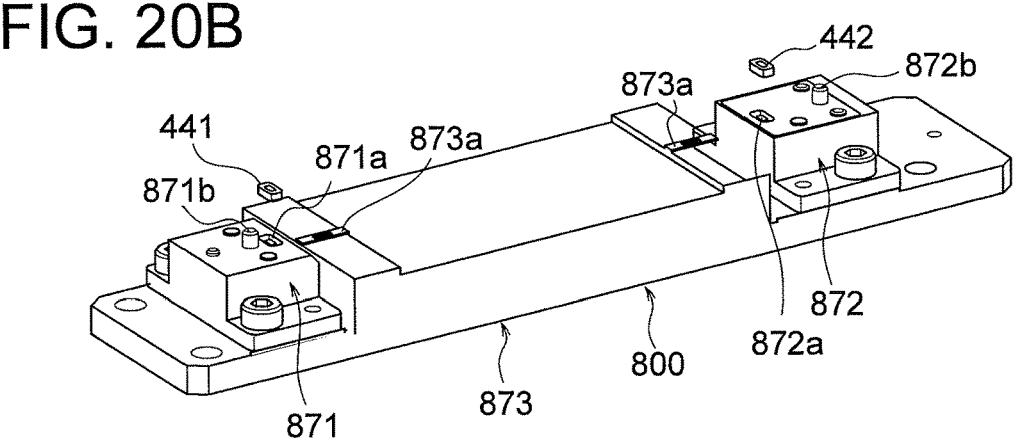
FIG. 20B is a perspective view schematically illustrating a process of positioning abutment members of the optical print head according to the fourth embodiment.
Figure 21:
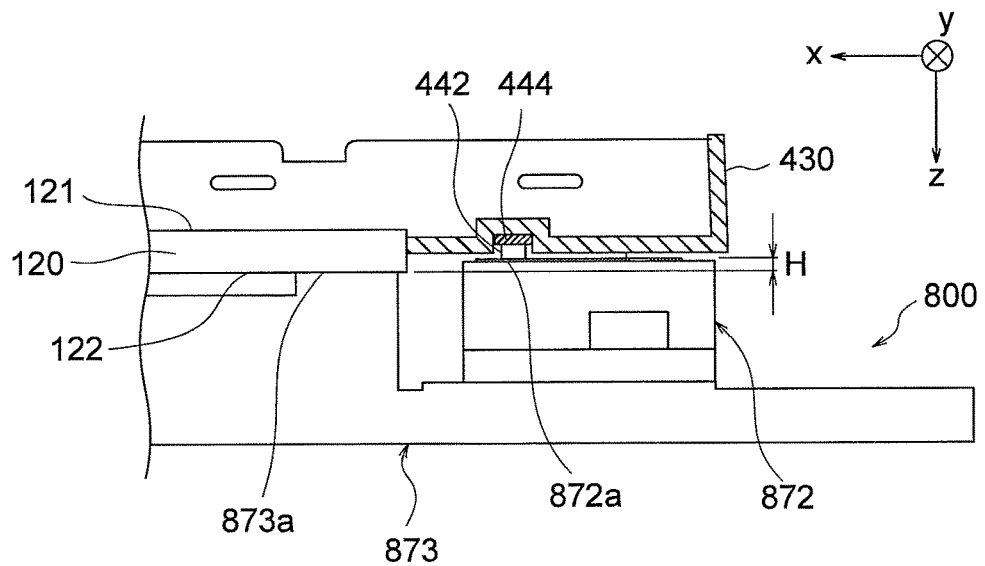
FIG. 21 is a sectional view schematically illustrating the process of positioning the abutment members of the optical print head according to the fourth embodiment.

FIG. 20A is a perspective view schematically illustrating a structure of the optical print head 400 according to the fourth embodiment. FIG. 20B is a perspective view schematically illustrating a process of positioning the abutment members 441 and 442 of the optical print head 400 according to the fourth embodiment. FIG. 21 is a sectional view schematically illustrating the process of positioning the abutment members 441 and 442 of the optical print head 400 according to the fourth embodiment. An example of a method for positioning the abutment members 441 and 442, which are the positioning members, so that Lo=Li (or Lo≈Li when an error is taken into account) will be described below.

First, the shapes of the abutment members 441 and 442 and the shapes of portions of the holder 430 on which the abutment members 441 and 442 are mounted will be described. Each of the abutment members 441 and 442 has a rectangular parallelepiped shape. The abutment members 441 and 442 are preferably made of material that transmits light (e.g., transparent material). In this example, the abutment members 441 and 442 are made of plastic resin that transmits light (or transparent plastic resin). However, the abutment members 441 and 442 may have other shapes as long as the abutment members 441 and 442 can abut the spacers to maintain the distance Li. Recesses 433 and 434 on which the abutment members 441 and 442 are to be mounted are formed in the holder 430, on which the abutment members 441 and 442 are mounted. The recesses 433 and 434 are formed near both ends of the holder 430 in the longitudinal direction (or main scanning direction). The recesses 433 and 434 are slightly larger than the abutment members 441 and 442. The UV curable adhesives 443 and 444 as curable resins are dropped or supplied into the recesses 433 and 434. The abutment members 441 and 442 are placed in the recesses 433 and 434 with the UV curable adhesives 443 and 444 between the abutment members 441 and 442 and the recesses 433 and 434. The UV curable adhesives 443 and 444 are irradiated with UV light to fix the abutment members 441 and 442 to the holder 430.

Next, a height H at which the abutment members 441 and 442 are mounted will be described. The abutment members 441 and 442 are positioning members for making the distance Li equal (or substantially equal) to the distance Lo. As illustrated in FIG. 19, with the second surface 122 of the lens array 120 as a reference, the mounting height H of the abutment members 441 and 442 is equal to the absolute value of the difference between a height Ha of the spacers 451 and 452 mounted on the surface 161 of the photosensitive drum 160 and the distance Li. This is represented by the equation: H=|Ha−Li|. Thus, the distance between the second surface 122 of the lens array 120 and abutment surfaces (or lower ends in FIGS. 19 and 21) of the abutment members 441 and 442 can be represented by the difference between the height Ha of the spacers 451 and 452 mounted on the surface 161 of the photosensitive drum 160 and the distance Li, and it is possible to make the distance Li equal (or substantially equal when an error is taken into account) to the distance Lo by adjusting the height H. Specifically, since the distance Li can be represented by Li=Ha−H, it is possible to make the distance Li equal (or substantially equal when an error is taken into account) to the distance Lo by setting the height H to (Ha−Lo).

Next, a method of positioning the abutment members 441 and 442 so that Lo=Li (or Lo≈Li) will be described. A jig 800 includes reference blocks 871 and 872 having abutment surfaces 871a and 872a against which the abutment surfaces of the abutment members 441 and 442 abut, and a reference block 873 having abutment surfaces 873a against which both ends of the second surface 122 of the lens array 120 in the longitudinal direction abut. The jig 800 is configured so that heights of the abutment surfaces 871a and 872a can be adjusted with a height of the abutment surfaces 873a as a reference. On the basis of the holder 430 to which the lens array 120 has been fixed so that the distance Lo between the surface of the light emitting element array 111 and the first surface 121 of the lens array 120 is the optimum distance for characteristics of the lens array 120, to set the height H of the abutment surfaces of the abutment members 441 and 442 relative to the second surface 122 of the lens array 120 to a height satisfying Lo=Li (or Lo≈Li) using the jig 800, the heights of the abutment surfaces 871a and 872a relative to the abutment surfaces 873a are adjusted to |Ha−Lo|. Then, the abutment members 441 and 442 are placed on the abutment surfaces 871a and 872a of the jig 800, and attracted by air suction or other ways. Thereby, the abutment members 441 and 442 are in close contact with and held on the abutment surfaces 871a and 872a of the reference blocks 871 and 872 of the jig 800.

Next, the UV curable adhesives 443 and 444 are dropped into the recesses 433 and 434 of the holder 430 to which the lens array 120 has been fixed with adhesive so that the distance Lo between the surface of the light emitting element array 111 and the first surface 121 of the lens array 120 is the optimum distance for characteristics of the lens array 120. Then, the holder 430 is positioned relative to the jig 800 by fitting pins 871b and 872b formed on the reference blocks 871 and 872 into a fitting groove 439 (FIG. 20A) and a fitting hole 438 (FIG. 20A) formed in the holder 430. Then, the holder 430 is moved until the second surface 122 of the lens array 120 abuts the abutment surfaces 873a of the reference block 873. Then, the second surface 122 of the lens array 120 is attracted by air suction or other ways to be brought into close contact with the abutment surfaces 873a, and the holder 430 with the lens array 120 fixed thereto is held on the abutment surfaces 873a.

Next, the UV curable adhesives 443 and 444 are irradiated with UV light through the abutment members 441 and 442 to be cured, thereby fixing the abutment members 441 and 442 to the holder 430. Thereby, the abutment members 441 and 442 are positioned so that Lo=Li (or Lo≈Li). In the fourth embodiment, since it is efficient to irradiate the UV curable adhesives 443 and 444 with UV light through the abutment members 441 and 442 to cure the UV curable adhesives 443 and 444, the abutment members 441 and 442 are made of material that transmits light (or transparent material). However, the abutment members 441 and 442 may be made of non-transparent material as long as the UV curable adhesives 443 and 444, which have been dropped at the positions facing the abutment surfaces of the abutment members 441 and 442, can be cured. As above, the holder 430 with the lens array 120 and abutment members 441 and 442 mounted thereon is formed.

<4-3> Advantages

As described above, in the optical print head 400 according to the fourth embodiment and the manufacturing method thereof, with the second surface 122 of the lens array 120 as a reference, the abutment members 441 and 442 are positioned and fixed to the holder 430 using the jig 800 so that Lo=Li (or Lo≈Li). This makes it possible to reduce the number of parts, downsize the optical print head, reduce the assembly time, or reduce the cost of the optical print head.

Further, the UV curable adhesives 443 and 444 are disposed to face abutment surfaces (flat surfaces) of the abutment members 441 and 442. Thus, when the optical print head 400 is urged toward the photosensitive drum 160, forces are exerted on wide surfaces of the UV curable adhesives 443 and 444 perpendicularly to the wide surfaces. Thus, even when the positions or dimensions of the abutment members 441 and 442 vary with environment or time, the variation is less likely to adversely affect the UV curable adhesives 443 and 444.

5 Fifth Embodiment

<5-1> Structure

Figure 22:
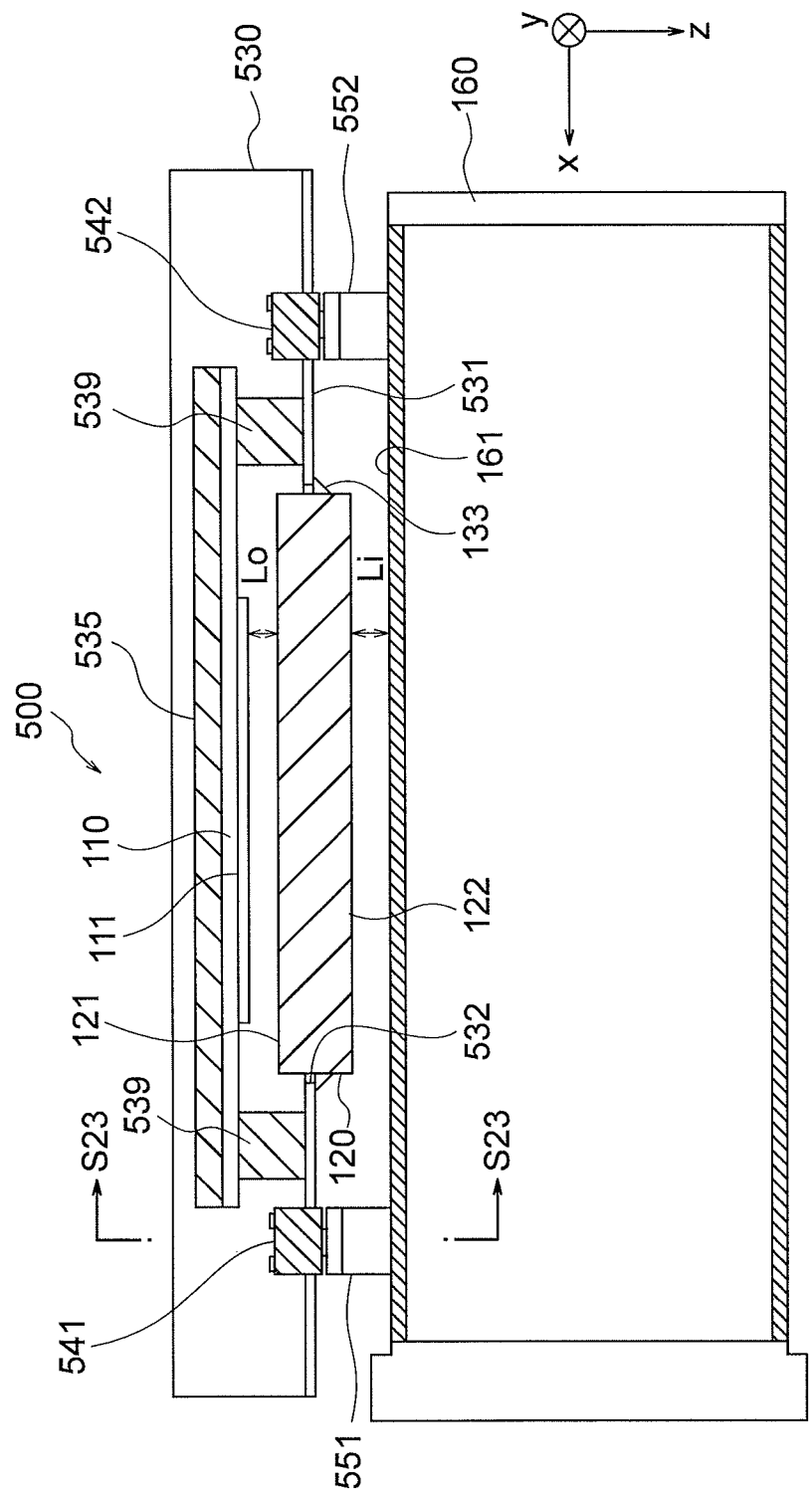
FIG. 22 is a sectional view schematically illustrating a structure of an optical print head according to a fifth embodiment of the present invention.
Figure 23:
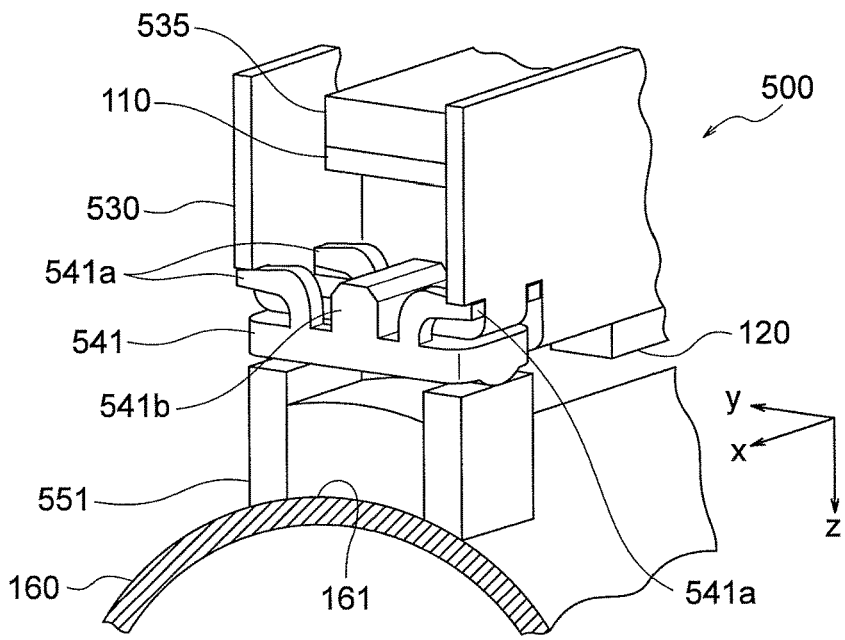
FIG. 23 is a perspective view (including a sectional view taken along line S23-S23 in FIG. 22) schematically illustrating a structure of a main part of the optical print head according to the fifth embodiment.
Figure 24:
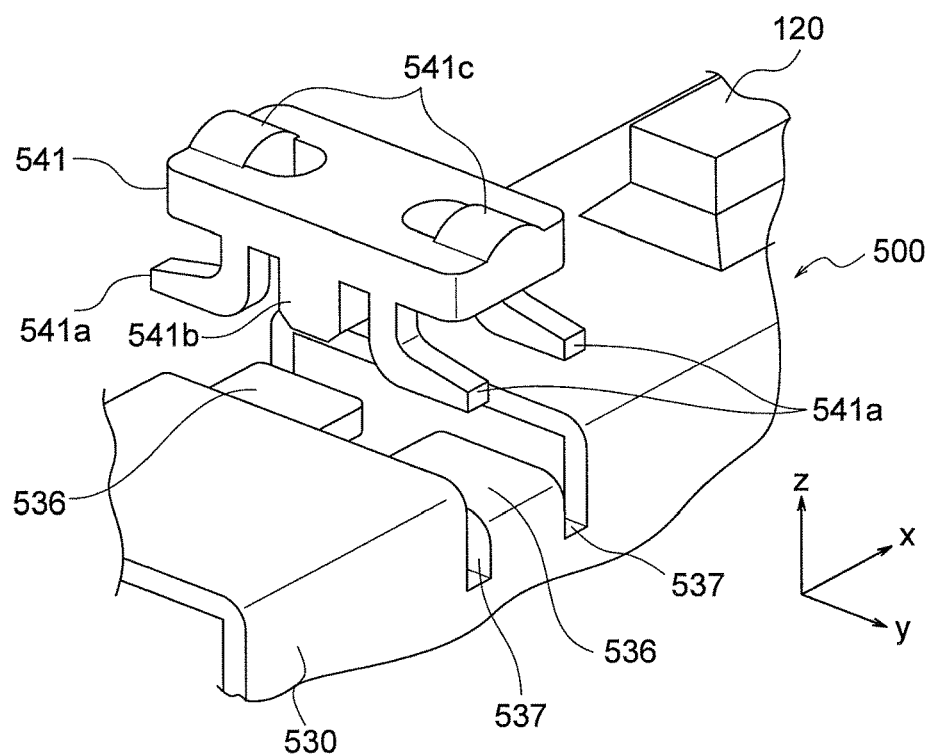
FIG. 24 is an exploded perspective view schematically illustrating the structure of the main part of the optical print head according to the fifth embodiment.

FIG. 22 is a sectional view schematically illustrating a structure of an optical print head 500 according to a fifth embodiment of the present invention. FIG. 23 is a perspective view schematically illustrating a structure of a main part of the optical print head 500 according to the fifth embodiment. FIG. 23 includes a sectional view taken along line S23-S23 in FIG. 22. FIG. 24 is an exploded perspective view schematically illustrating the structure of the main part of the optical print head 500 according to the fifth embodiment.

As illustrated in FIGS. 22 to 24, the optical print head 500 is an exposure device for illuminating the surface 161 of the photosensitive drum 160 that faces the optical print head 500 via spacers 551 and 552. The optical print head 500 includes the mounting substrate 110 on which the light emitting element array 111 is mounted, the lens array 120 that focuses light emitted from the light emitting element array 111 onto the surface 161 of the photosensitive drum 160, and a holder (or lens holder) 530 as a holding member that holds the mounting substrate 110 and lens array 120. The light emitting array 111, which may be composed of multiple light emitting element array chips, includes multiple light emitting elements arranged in the x direction. The lens array 120 includes, for example, multiple microlenses (e.g., erecting equal magnification imaging lenses) arranged in a regular manner. As illustrated in FIG. 22, the lens array 120 has the first surface 121 and the second surface 122. The first surface 121 is the end surface on the light emitting element array 111 side of the lens array 120 and is the light incident surface. The second surface 122 is the end surface on the photosensitive drum 160 side of the lens array 120 and is the light emitting surface.

As illustrated in FIGS. 22 to 24, the optical print head 500 further includes abutment members 541 and 542 as an abutment portion provided on the holder 530. The abutment members 541 and 542 are disposed near both ends of the holder 530 in the longitudinal direction (or x direction). As illustrated in FIG. 22, the abutment member 541 as a first spacer member abuts the spacer 551. The abutment member 542 as a second spacer member abuts the spacer 552. The abutment members 541 and 542 and the spacers 551 and 552, which slide on the surface 161 of the photosensitive drum 160, set or define the clearance or distance Li between the second surface 122 of the lens array 120 and the surface 161 of the photosensitive drum 160.

The holder 530 has a support surface 531 that faces the photosensitive drum 160, and an opening (or slit) 532 formed in the support surface 131 and elongated in the x direction. The opening 532 is a through hole in which the lens array 120 is inserted. The lens array 120 is inserted in the opening 532 with its longitudinal direction parallel to the x direction, and is fixed to the support surface 531 of the holder 530 with adhesive (e.g., UV adhesive). To prevent foreign matter, such as toner, from entering the inside (or light emitting element array 111 side) of the holder 530, it is preferable that a space around the lens array 120 in the opening 532 of the holder 530 be sealed by the sealing member 133 surrounding the lens array 120.

To set the distance Lo between the surface of the light emitting element array 111 and the first surface 121 of the lens array 120 to a predetermined distance, the mounting substrate 110 is placed on substrate spacers 539 fixed to the holder 530, and is pressed against the substrate spacers 539 (in the +z direction) by a pressure member 535, such as a spring, to be fixed. The lens array 120 is fixed to the holder 530 so that the distance Lo is an optimum distance for characteristics of the lens array 120. The abutment members 541 and 542 are disposed near both ends of the holder 530 in the x direction to face the spacers 551 and 552 placed on the surface 161 of the photosensitive drum 160. The positions of the abutment members 541 and 542 are adjusted so that the distance Li between the second surface 122 of the lens array 120 and the surface 161 of the photosensitive drum 160 is equal (or substantially equal when an error is taken into account) to the distance Lo.

<5-2> Manufacturing method

A method of manufacturing the optical print head 500 for illuminating the photosensitive drum 160 that faces the optical print head 500 will be described. First, the abutment members 541 and 542 are fitted into the holder 530 holding the mounting substrate 110 with the light emitting element array 111 and the lens array 120 for focusing or imaging light emitted from the light emitting element array 111, and UV curable adhesives (or bodies of UV curable adhesive) 580, which are curable resins before being cured, are supplied between the abutment members 541 and 542 and the holder 530. Then, an image imaged by the lens array 120 is observed by an observation device, and thicknesses of the UV curable adhesives 580 are adjusted on the basis of the observed image. Then, the UV curable adhesives are cured, thereby setting heights (or shapes) of the abutment members 541 and 542.

Figure 25:
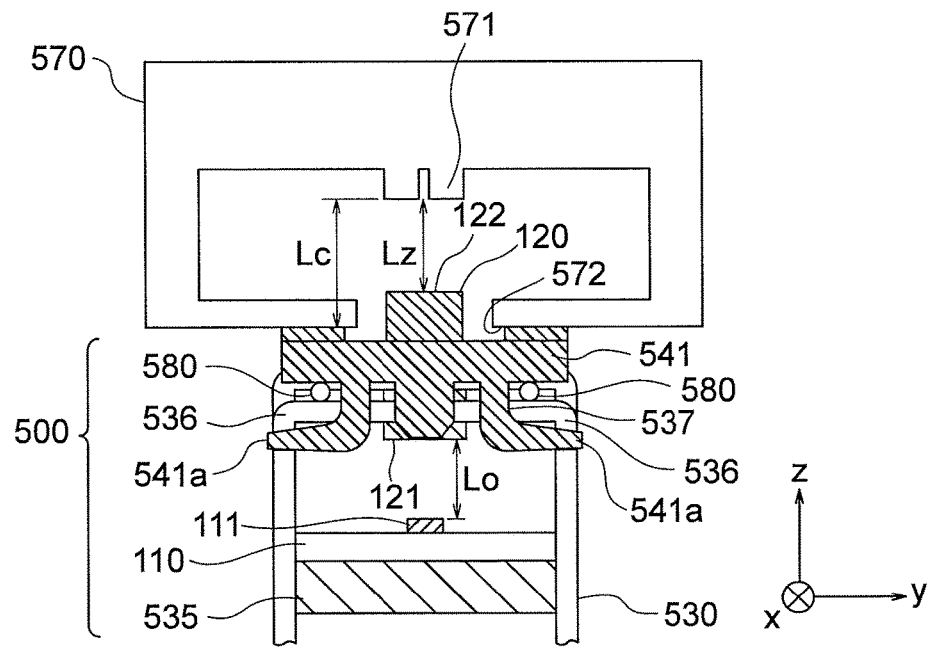
FIG. 25 is a sectional view schematically illustrating a process of manufacturing the optical print head according to the fifth embodiment.
Figure 26:
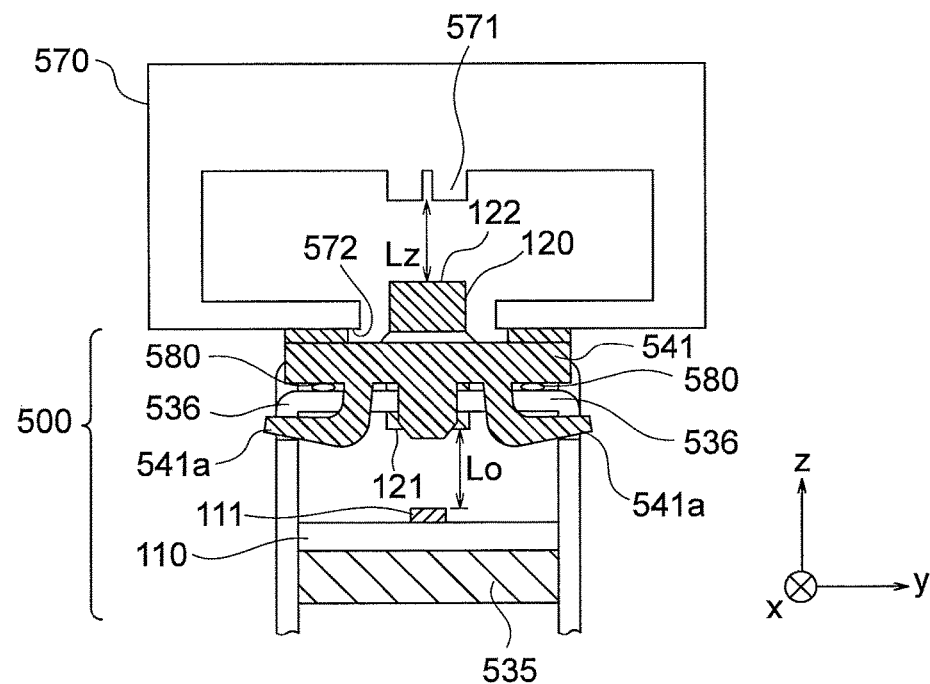
FIG. 26 is a sectional view schematically illustrating a process of manufacturing the optical print head according to the fifth embodiment.

Next, the method of manufacturing the optical print head 500 will be described in more detail. FIGS. 25 and 26 are sectional views schematically illustrating a process of manufacturing the optical print head 500 according to the fifth embodiment.

The shape of the abutment member 541 and the shape of a portion of the holder 530 on which the abutment member 541 is mounted will be described. The abutment member 542 has the same structure as the abutment member 541. As illustrated in FIGS. 23 and 24, the abutment member 541 is made of resin material. The abutment member 541 has: four L-shaped elastic portions 541a formed at four corners of the abutment member 541; a sliding rib 541b formed between two of the four L-shaped elastic portions 541a on the +y side and the other two of the four L-shaped elastic portions 541a on the −y side; and two mounting portions 541c having a convex shape and formed on a surface opposite the L-shaped elastic portions 541a (or on an opposite side of the L-shaped elastic portions 541a in the z direction). The holder 530 can be produced by sheet-metal press working. The holder 530 has folded portions 536 formed at positions outside the lens array 120 in the x direction by folding both sides inward in a transverse direction (or the y direction), and holder slit portions 537 formed on both sides of each of the folded portions 536. The L-shaped elastic portions 541a of the abutment member 541 are inserted in the holder slit portions 537. The sliding rib 541b is inserted between the folded portions 536. The UV curable adhesives (or UV curable resin portions) 580, which are an example of curable resins, that are cured by UV radiation are dropped or supplied onto the folded portions 536 as illustrated in FIG. 25, and are pressed by the abutment member 541 as illustrated in FIG. 26. In a state where the abutment member 541 is mounted on the holder 530 with no load applied thereto, a clearance is maintained between a bottom surface of the abutment member 541 and the folded portions 536. The abutment member 542 is mounted on the holder 530 in the same manner as the abutment member 541.

Next, as illustrated in FIGS. 25 and 26, the holder 530 on which the lens array 120, light emitting element array 111, mounting substrate 110, substrate spacers 539, pressure member 535, and abutment members 541 and 542 are mounted is set on a focus sensor device 570 including a sensor for detecting a focal position. The focus sensor device 570 has a sensor light receiving portion 571 for detecting the focal position and a sensor reference surface 572 against which the abutment members 541 and 542 abut. A distance between the sensor light receiving portion 571 and the sensor reference surface 572 is fixed at a virtual surface distance Lc that is equal to an ideal height (or designed height) of the spacers 551 and 552 from the surface 161 of the photosensitive drum 160. The focus sensor device 570 determines a distance Lz from the second surface 122 of the lens array 120 to an imaging position of light emitted from the second surface 122 of the lens array 120 by the sensor light receiving portion 571, and outputs a signal indicating the distance Lz. The output distance Lz is equal to the distance Li from the second surface 122 of the lens array 120 to the surface 161 of the photosensitive drum 160.

Next, the holder 530 with the lens array 120 fixed thereto is moved in an optical system direction (or the ±z direction) by a lifting and lowering device (not illustrated) so that the distance Lz satisfies Lz=Lo=Li, which is an optimum condition for characteristics of the lens array 120. As the holder 530 moves up (or in the +z direction), the abutment members 541 and 542 are pressed against the sensor reference surface 572 of the focus sensor device 570 by the slit portions 537 to elastically deform so that the L-shaped elastic portions 541a move up as illustrated in FIG. 26. Then, as the holder 530 moves down (or in the −z direction), the abutment members 541 and 542 are released from the pressure to deform back to the shapes when no load is applied to them as illustrated in FIG. 25. The holder 530 is moved up and down (or in the ±z direction) and thereby positioned so that the condition Lz=Lo=Li is satisfied. In this position, the UV curable adhesives 580 supplied between the folded portions 536 and the bottom surfaces of the abutment members 541 and 542 are cured by a UV irradiator (not illustrated), thereby fixing the positions of the abutment members 541 and 542 relative to the holder 530.

<5-3> Advantages

As above, in the optical print head 500 according to the fifth embodiment, when the distance Li is adjusted, the abutment members 541 and 542 are pressed and the L-shaped elastic portions 541a are elastically deformed; after the distance Li is adjusted, the abutment members 541 and 542 are fixed to the holder 530. This can simplify the shape of the holder 530 and the structure of the optical print head 500, and reduce the number of parts, thereby reducing the cost of the optical print head 500.

Further, as illustrated in FIG. 26, the UV curable adhesives 580 are disposed between the abutment members 541 and 542 and the folded portions 536 facing the abutment members 541 and 542 in the z direction. Thus, when the optical print head 500 is pressed in the z direction, the UV curable adhesives 580 are subjected to a force in the z direction and no force in the x and y directions, and therefore the cured UV curable adhesives 580 are less likely to deform.

<5-4> Modification

Figure 27:
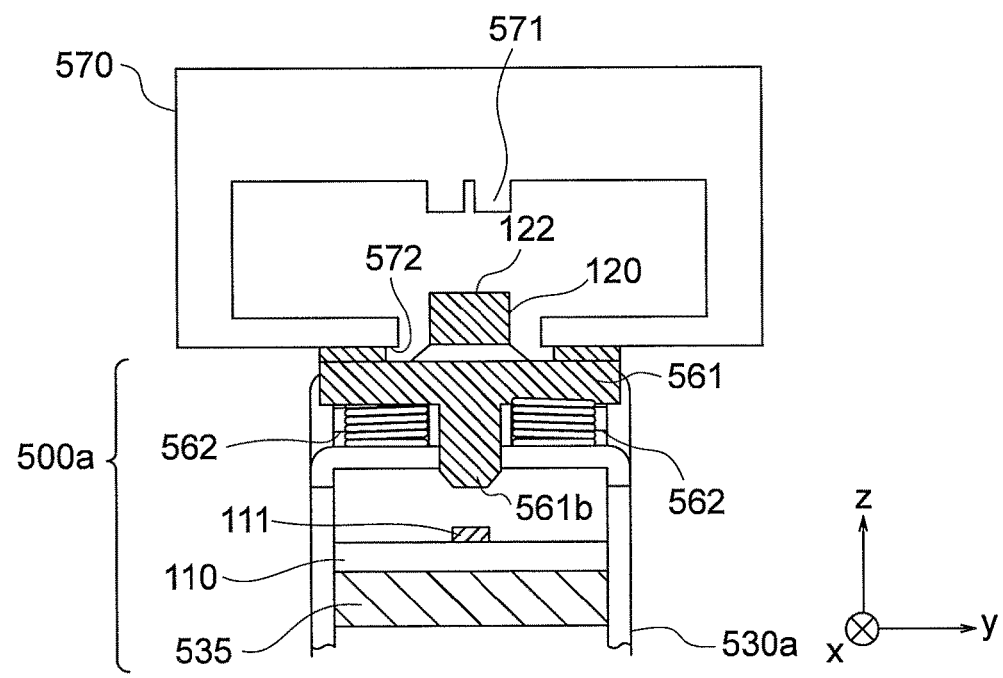
FIG. 27 is a sectional view schematically illustrating a structure of an optical print head according to a modification of the fifth embodiment.

FIG. 27 is a sectional view schematically illustrating a structure of an optical print head 500a according to a modification of the fifth embodiment. In FIG. 27, elements that are the same as or correspond to those in FIG. 25 have the same reference characters. The optical print head 500a illustrated in FIG. 27 differs from the optical print head 500 illustrated in FIGS. 22 to 26 in having abutment members 561 simpler than the abutment members 541 and 542 and using coil springs 562 and adhesives (or UV curable adhesives) that fix the coil springs 562 (or their shapes) instead of the UV curable adhesives 580. With the structure of FIG. 27, it is possible to simplify the shapes of the abutment members 561 and reduce the cost. Except for the above, the optical print head 500a is the same as the optical print head 500.

6 Sixth Embodiment

<6-1> Configuration

Figure 28:
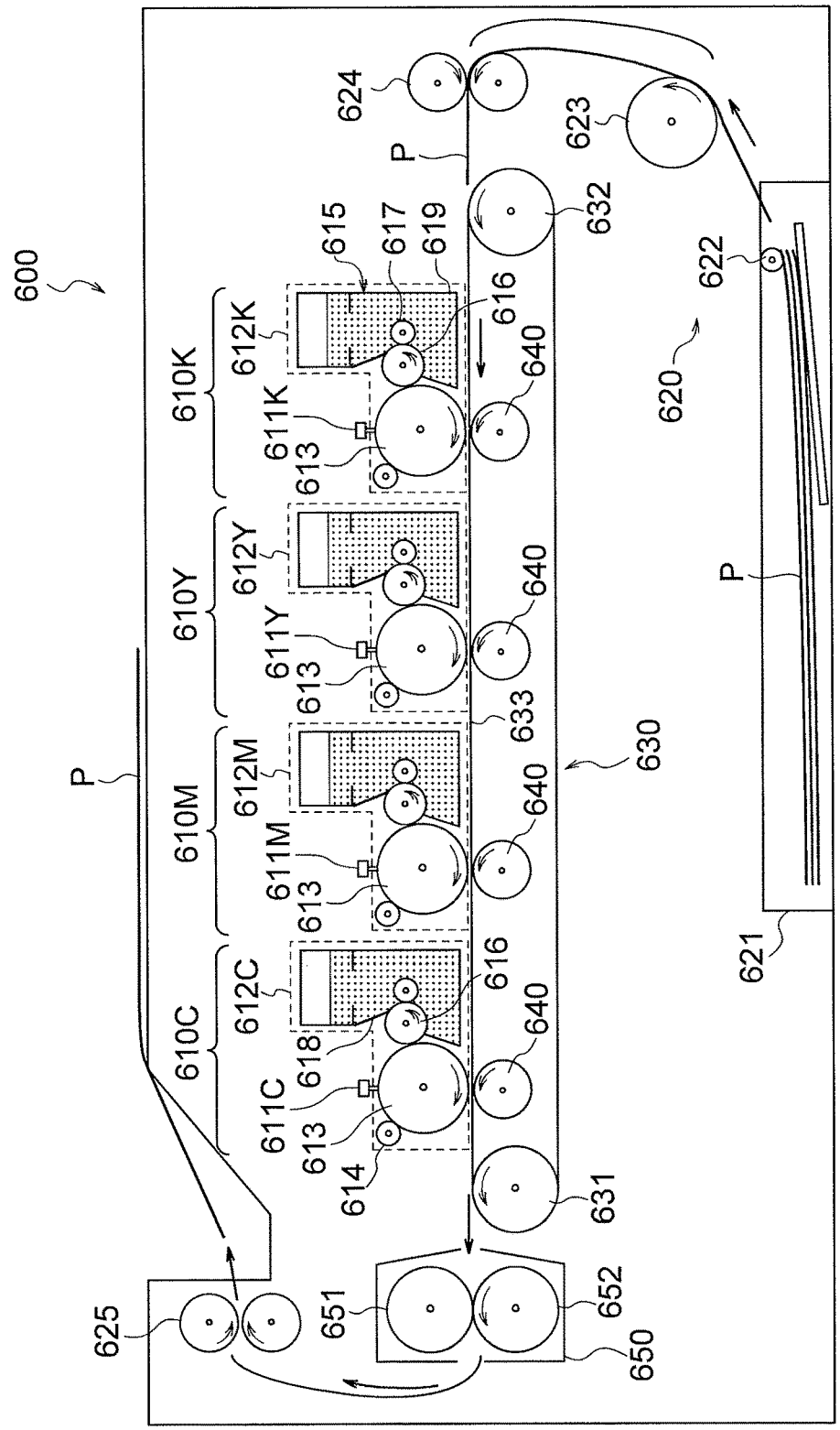
FIG. 28 is a sectional view schematically illustrating a configuration of an image forming apparatus according to a sixth embodiment of the present invention.

FIG. 28 is a sectional view schematically illustrating a configuration of an image forming apparatus 600 according to a sixth embodiment of the present invention. The image forming apparatus 600 is, for example, an electrophotographic color printer. The image forming apparatus 600 includes optical print heads 611K, 611Y, 611M, and 611C as exposure devices, each of which is one of the optical print heads described in the first to fifth embodiments and modifications thereof.

As illustrated in FIG. 28, the image forming apparatus 600 includes as major components: image forming sections 610K, 610Y, 610M, and 610C that form developer images (or toner images) by electrophotography; a medium supply unit (or paper feeding unit) 620 that supplies a recording medium P, such as a sheet of paper, to the image forming sections 610K, 610Y, 610M, and 610C; a conveying unit 630 that conveys the recording medium P; transfer rollers 640 as transfer units that are arranged to correspond to the image forming sections 610K, 610Y, 610M, and 610C, and transfer the toner images formed by the image forming sections 610K, 610Y, 610M, and 610C onto the recording medium P; a fixing unit 650 that fixes the toner images transferred on the recording medium P onto the recording medium P; and a pair of paper discharging rollers 625 as a medium discharging unit that discharges the recording medium P passing through the fixing unit 650 outside the image forming apparatus 600. FIG. 28 illustrates the four image forming sections 610K, 610Y, 610M, and 610C, but the number of image forming sections in the image forming apparatus 600 may be three or less, or five or more. The image forming apparatus 600 illustrated in FIG. 28 is a color printer, but the present invention is also applicable to a monochrome printer that includes a single image forming section and forms an image on a recording medium by electrophotography. The image forming apparatus 600 illustrated in FIG. 28 is a printer, but the present invention is also applicable to other apparatuses, such as copiers, facsimile machines, and multi-function peripherals (MFPs), that form images on recording media by electrophotography.

As illustrated in FIG. 28, the medium supply unit 620 includes: a medium cassette (or paper sheet cassette) 621; a paper feed roller (or hopping roller) 622 that feeds one by one recording media P loaded in the medium cassette 621; a roller 623 that conveys the recording medium P fed from the medium cassette 621; and a pair of rollers 624 that convey the recording medium P to the image forming sections 610K, 610Y, 610M, and 610C.

The image forming sections 610K, 610Y, 610M, and 610C form black (K), yellow (Y), magenta (M), and cyan (C) toner images, respectively. The image forming sections 610K, 610Y, 610M, and 610C are arranged along a medium conveying path from the upstream side to the downstream side in a medium conveying direction (indicated by arrows in FIG. 28). The image forming sections 610K, 610Y, 610M, and 610C respectively include detachable image forming units 612K, 612Y, 612M, and 612C for the respective colors. The image forming units 612K, 612Y, 612M, and 612C arranged in series are provided corresponding to the respective colors of the image forming sections 610K, 610Y, 610M, and 610C. The image forming unit 612C forms an image with cyan toner, the image forming unit 612M forms an image with magenta toner, the image forming unit 612Y forms an image with yellow toner, and the image forming unit 612K forms an image with black toner. The image forming units 612K, 612Y, 612M, and 612C basically have the same configuration except for the color of toner.

The image forming sections 610K, 610Y, 610M, and 610C respectively include the optical print heads 611K, 611Y, 611M, and 611C as exposure devices for the respective colors.

Each of the image forming units 612K, 612Y, 612M, and 612C includes: a photosensitive drum 613 as an image carrier supported rotatably; a charging roller 614 as a charging member that uniformly charges a surface of the photosensitive drum 613; and a developing device 615 that, after the optical print head 611K, 611Y, 611M, or 611C exposes the surface of the photosensitive drum 613 to form an electrostatic latent image thereon, supplies toner to the surface of the photosensitive drum 613 to form a toner image corresponding to the electrostatic latent image.

The developing device 615 includes: a toner container as a developer container that forms a developer storage space for storing the toner; a developing roller 616 as a developer carrier that supplies the toner to the surface of the photosensitive drum 613; a supply roller 617 that supplies the toner stored in the toner container to the developing roller 616; and a developing blade 618 as a toner regulating member that regulates the thickness of a toner layer on a surface of the developing roller 616.

Each of the optical print heads 611K, 611Y, 611M, and 611C exposes the uniformly charged surface of the photosensitive drum 613 based on image data for printing. Each of the optical print heads 611K, 611Y, 611M, and 611C includes at least one light emitting element array in which multiple light emitting elements (e.g., LED elements) are arranged in an axial direction of the photosensitive drum 613.

As illustrated in FIG. 28, the conveying unit 630 includes: a conveying belt (or transfer belt) 633 that conveys the recording medium P while electrostatically attracting it; a drive roller 631 that is rotated by a driver to drive the conveying belt 633; and a tension roller (or driven roller) 632 that stretches the conveying belt 633 together with the drive roller 631.

As illustrated in FIG. 28, the transfer rollers 640 are disposed to face the respective photosensitive drums 613 of the image forming units 612K, 612Y, 612M, and 612C with the conveying belt 633 therebetween. The developer images (or toner images) formed on the surfaces of the respective photosensitive drums 613 of the image forming units 612K, 612Y, 612M, and 612C are sequentially transferred by the transfer rollers 640 onto the upper surface of the recording medium P conveyed along the medium conveying path in the direction indicated by the arrows in FIG. 28, so that a color image in which the multiple toner images are superposed is formed.

The fixing unit 650 includes a pair of rollers 651 and 652 in pressure contact with each other. The roller 651 is a heat roller including a heater, and the roller 652 is a pressure roller pressed against the roller 651. The recording medium P with the unfixed developer image (or toner image) passes between the pair of rollers 651 and 652 of the fixing unit 650. At this time, the unfixed toner image is heated and pressed to be fixed onto the recording medium P.

<6-2> Operation

First, a recording medium P in the medium cassette 621 is fed by the hopping roller 622 to the registration roller 623. Then, the recording medium P is conveyed from the registration roller 623 via the pair of rollers 624 to the conveying belt 633, and conveyed to the image forming units 612K, 612Y, 612M, and 6120 in accordance with travel of the conveying belt 633. In the image forming units 612K, 612Y, 612M, and 6120, the surfaces of the photosensitive drums 613 are charged by the charging rollers 614, and exposed by the optical print heads 611K, 611Y, 611M, and 611C, so that electrostatic latent images are formed. The thin-layered toners on the developing rollers 616 electrostatically adhere to the electrostatic latent images, so that toner images of the respective colors are formed. The toner images of the respective colors are transferred onto the recording medium P by the transfer rollers 640, so that a color toner image is formed on the recording medium P. Toner remaining on the photosensitive drums 613 after the transfer is removed by cleaning devices (not illustrated). The recording medium P with the color toner image formed thereon is conveyed to the fixing unit 650. In the fixing unit 650, the color toner image is fixed onto the recording medium P, so that a color image is formed. The recording medium P with the toner image formed thereon is discharged to a paper sheet stacker by the pair of discharging rollers 625.

<6-3> Advantages

The image forming apparatus 600 according to the sixth embodiment employs the optical print heads according to one of the first to fifth embodiments and modifications thereof. Thus, the cost of the image forming apparatus 600 can be reduced.

<7> Modifications

The present invention is not limited to the embodiments and modifications described above; it can be practiced in various other aspects without departing from the inventive scope.

Although the above description has illustrated examples in which the abutment members or the adhesives for fixing the abutment members are UV curable resins or UV curable adhesives, the abutment members or the adhesives for fixing the abutment members may be other curable resins, such as curable materials that are cured by curing accelerators, or curable materials that are cured by temperature change (or heating).

Further, although the above description has illustrated examples in which the abutment members are transparent resins that transmit light, the abutment members need not necessarily be transparent.

Further, the structures of the first to fifth embodiments and modifications thereof may be combined appropriately.

What is claimed is:

1. An optical print head for illuminating an image carrier that faces the optical print head, the optical print head comprising:
    a substrate on which a light emitting element array is mounted;
    a lens array for focusing light emitted from the light emitting element array onto the image carrier;
    a holder holding the substrate and the lens array; and
    at least one spacer member, disposed on the holder, for maintaining a predetermined distance between the lens array and the image carrier, the at least one spacer member being made of curable resin that is cured under a predetermined condition or fixed to the holder with curable adhesive that is cured under a predetermined condition.

2. The optical print head of claim 1, wherein the curable resin is one of ultraviolet curable resin that is cured by exposure to ultraviolet light, thermosetting resin that is cured by heating, and curable resin that is cured by a curing accelerator.

3. The optical print head of claim 1, wherein the curable adhesive is one of ultraviolet curable adhesive that is cured by exposure to ultraviolet light, adhesive that is cured by heating, and adhesive that is cured by a curing accelerator.

4. The optical print head of claim 1, wherein the at least one spacer member comprises:
    a first spacer member disposed on one side of the lens array in a main scanning direction of the lens array; and
    a second spacer member disposed on another side of the lens array in the main scanning direction.

5. The optical print head of claim 1, wherein the at least one spacer member comprises:
    a first spacer member disposed on one side of the lens array in a main scanning direction of the lens array; and
    a second spacer member and a third spacer member disposed on another side of the lens array in the main scanning direction, and
    wherein the second spacer member and the third spacer member are spaced from each other in a sub scanning direction perpendicular to the main scanning direction.

6. The optical print head of claim 1, wherein the at least one spacer member includes an elastic portion in contact with the holder, and
    wherein the at least one spacer member is fixed to the holder with the curable adhesive in a state in which the elastic portion is elastically deformed.

7. The optical print head of claim 5, wherein the holder has a support surface, wherein the support surface has a wide portion that is wide in the sub scanning direction, and wherein the second spacer member and the third spacer member are disposed on the wide portion and spaced from each other in the sub scanning direction.

8. The optical print head of claim 1, wherein the holder has a support surface, and wherein the at least one spacer member is fixed on the support surface.

9. The optical print head of claim 1, wherein the holder has a support surface having at least one through hole, and wherein the at least one spacer member is fixed in the at least one through hole.

10. The optical print head of claim 1, wherein the holder has a support surface having at least one recess, and wherein the at least one spacer member is fixed in the at least one recess.

11. The optical print head of claim 1, further comprising a protective ring disposed to surround an outer periphery of the at least one spacer member.

12. The optical print head of claim 1, wherein the at least one spacer member is made of material that transmits ultraviolet light.

13. An image forming apparatus comprising:

an image carrier; and the optical print head of claim 1 that illuminates the image carrier with light based on image data.

14. A method of manufacturing an optical print head for illuminating an image carrier that faces the optical print head, the method comprising:

placing a curable resin on a holder holding a substrate on which a light emitting element array is mounted and a lens array for focusing light emitted from the light emitting element array onto the image carrier;

adjusting a height of the curable resin in a direction from the lens array to the image carrier; and curing the curable resin to form a cured product as a spacer member for maintaining a predetermined distance between the lens array and the image carrier.

15. The method of claim 14, wherein the curable resin is one of ultraviolet curable resin that is cured by exposure to ultraviolet light, thermosetting resin that is cured by heating, and curable resin that is cured by a curing accelerator.

16. A method of manufacturing an optical print head for illuminating an image carrier that faces the optical print head, the method comprising:

placing, on a holder holding a substrate on which a light emitting element array is mounted and a lens array for focusing light emitted from the light emitting element array onto the image carrier, a spacer member for maintaining a predetermined distance between the lens array and the image carrier, and a curable adhesive;

adjusting a height of the spacer member in a direction from the lens array to the image carrier; and curing the curable adhesive to fix the spacer member to the holder.

17. The method of claim 16, wherein the curable adhesive is one of ultraviolet curable adhesive that is cured by exposure to ultraviolet light, adhesive that is cured by heating, and adhesive that is cured by a curing accelerator.

* * * * *